United States Patent
Trovero et al.

(10) Patent No.: US 12,340,445 B1
(45) Date of Patent: Jun. 24, 2025

(54) HIERARCHICAL MODELING NODE FOR VISUAL FORECASTING

(71) Applicant: SAS Institute, Inc., Cary, NC (US)

(72) Inventors: Michele Angelo Trovero, Cary, NC (US); Mahesh Vijaykumar Joshi, Cary, NC (US); Steven Christopher Mills, Raleigh, NC (US); Phillip Mark Helmkamp, Apex, NC (US); Youngjin Park, Durham, NC (US); Iman Vasheghani Farahani, Charlotte, NC (US); Rajib Nath, Pune (IN); Kritika Misra, Maharashtra (IN); Vilochan Suresh Muley, Pune, IN (US); Ran Bi, Apex, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 18/980,190

(22) Filed: Dec. 13, 2024

Related U.S. Application Data

(60) Provisional application No. 63/685,854, filed on Aug. 22, 2024.

(30) Foreign Application Priority Data

Aug. 21, 2024 (IN) .............................. 202411063211

(51) Int. Cl.
  *G06T 11/20* (2006.01)
  *G06F 3/0482* (2013.01)
  (Continued)

(52) U.S. Cl.
  CPC .......... *G06T 11/206* (2013.01); *G06F 3/0482* (2013.01); *G06F 8/34* (2013.01); *G06F 8/38* (2013.01)

(58) Field of Classification Search
  CPC ........ G06T 11/206; G06F 3/0482; G06F 8/34; G06F 8/38; G06F 17/18; G06Q 10/04
  See application file for complete search history.

(56) References Cited

U.S. PATENT DOCUMENTS

| | | |
|---|---|---|
| 8,112,302 B1 | 2/2012 | Trovero et al. |
| 8,364,517 B2 | 1/2013 | Trovero et al. |

(Continued)

*Primary Examiner* — Jeffery A Brier
(74) *Attorney, Agent, or Firm* — Kilpatrick Townsend & Stockton LLP

(57) ABSTRACT

A system described herein can generate a graphical user interface (GUI) for a piece of forecasting software. The GUI can include graphical nodes arranged on a drag-and-drop canvas to define an overall forecasting pipeline. The graphical nodes can include a hierarchical modeling node that enables a user to define a time series hierarchy. The hierarchical modeling node can also enable separate level pipelines to be customized for each level of the time series hierarchy. The level pipelines can form subparts of the overall forecasting pipeline. The system can then execute the level pipelines to generate multiple forecasts, where each forecast corresponds to a respective level of the time series hierarchy. In some examples, the system can execute a reconciliation process on the forecasts to generate reconciled forecasts. Each reconciled forecast can correspond to one of the forecasts. The system may then generate one or more visualizations of the reconciled forecasts.

30 Claims, 23 Drawing Sheets

(51) Int. Cl.
   *G06F 8/34*      (2018.01)
   *G06F 8/38*      (2018.01)

(56) References Cited

U.S. PATENT DOCUMENTS

| | | | |
|---|---|---|---|
| 10,372,734 B2 | 8/2019 | Trovero et al. | |
| 2012/0089609 A1 | 4/2012 | Trovero et al. | |
| 2013/0024167 A1* | 1/2013 | Blair | G06F 17/18 |
| | | | 703/2 |
| 2013/0024173 A1* | 1/2013 | Brzezicki | G16B 40/00 |
| | | | 703/6 |
| 2014/0019909 A1* | 1/2014 | Leonard | G06Q 30/02 |
| | | | 715/804 |
| 2018/0222043 A1 | 8/2018 | Trovero et al. | |
| 2018/0260106 A1* | 9/2018 | Leonard | G06F 3/04847 |
| 2019/0384640 A1* | 12/2019 | Swamy | G06F 9/453 |
| 2019/0394083 A1* | 12/2019 | Sglavo | G06F 17/18 |
| 2023/0297809 A1* | 9/2023 | Vasheghani Farahani | |
| | | | G06N 3/084 |
| | | | 706/11 |
| 2023/0419132 A1* | 12/2023 | Issoe | G06Q 10/08 |

* cited by examiner

HIERARCHICAL MODELING NODE FOR VISUAL FORECASTING

REFERENCE TO RELATED APPLICATIONS

This claims the benefit of priority under 35 U.S.C. § 119(b) to Indian Provisional Patent Application No. 202411063211, filed Aug. 21, 2024, and the benefit of priority under 35 U.S.C. § 119(e) to U.S. Provisional Patent Application No. 63/685,854, filed Aug. 22, 2024, the entirety of each of which is hereby incorporated by reference herein.

TECHNICAL FIELD

The present disclosure relates generally to graphical user interfaces and related computing systems for visual forecasting on a computer. More specifically, but not by way of limitation, this disclosure relates to a hierarchical modeling node that can be added to a set of graphical nodes defining an overall forecasting pipeline in a graphical user interface, where the hierarchical modeling node can allow a user to create a custom time-series hierarchy and corresponding level pipelines for execution within the overall forecasting pipeline.

BACKGROUND

Visual forecasting software can enable users to generate forecasts from historical time series data using automation and sophisticated analytics. Visual forecasting may be provided by analytics platforms that can accommodate large-scale, parallel, and distributed time series modeling and forecasting. Some examples of visual forecasting software may provide graphical user interfaces (GUIs) that allow users to build projects using visual workflows or "pipelines." The pipelines may include features such as model and variable selection, forecasting, time series analysis, and so on.

During visual forecasting, a GUI can be used for selection of time series analysis techniques and generation of forecasts. The visual forecasting GUI may include components for configuring data, developing and operating pipelines, selection of "champion" forecasting models, and generation of reports following pipeline execution. To define a pipeline, a user can interact with the GUI to position a series of graphical nodes on a drag-and-drop canvas. The graphical nodes can correspond to various functions that can execute in a specified order including both serial and parallel operations. For example, the graphical nodes may correspond to various functions for data input, model assessment, model comparison, output, etc. The user can then run the pipeline to execute the corresponding functions in the defined sequence on a time series dataset to generate a forecast.

SUMMARY

One example of the present disclosure includes a system comprising one or more processors and one or more memories. The one or more memories include program code that is executable by the one or more processors to perform operations. The operations can include generating a graphical user interface (GUI) for a piece of forecasting software, wherein the GUI includes a drag-and-drop canvas comprising a set of graphical nodes arranged to define an overall forecasting pipeline. Each node in the set of graphical nodes can correspond to a respective operation in the overall forecasting pipeline. The operations can include, based on a user input, attaching a hierarchical modeling node to the set of graphical nodes on the drag-and-drop canvas. The hierarchical modeling node can enable a user to define a time series hierarchy comprising a plurality of levels. The hierarchical modeling node can enable one or more users to customize separate level pipelines for each level of the time series hierarchy independently of the other level pipelines for the other levels of the time series hierarchy. Each of the level pipelines can be a respective subpart of the overall forecasting pipeline. The operations can include executing the level pipelines for the plurality of levels of the time series hierarchy to generate a plurality of forecasts. Each forecast of the plurality of forecasts can correspond to a respective level of the time series hierarchy. The operations can include executing a reconciliation process on the plurality of forecasts to generate a plurality of reconciled forecasts for the plurality of levels of the time series hierarchy. Each reconciled forecast of the plurality of reconciled forecasts can correspond to a respective forecast of the plurality of forecasts. The operations can include generating a visualization of a reconciled forecast of the plurality of reconciled forecasts.

Another example of the present disclosure includes a computer-implemented method of operations. The operations can be executed by one or more processors. The operations can include generating a graphical user interface (GUI) for a piece of forecasting software, wherein the GUI includes a drag-and-drop canvas comprising a set of graphical nodes arranged to define an overall forecasting pipeline. Each node in the set of graphical nodes can correspond to a respective operation in the overall forecasting pipeline. The operations can include, based on a user input, attaching a hierarchical modeling node to the set of graphical nodes on the drag-and-drop canvas. The hierarchical modeling node can enable a user to define a time series hierarchy comprising a plurality of levels. The hierarchical modeling node can enable one or more users to customize separate level pipelines for each level of the time series hierarchy independently of the other level pipelines for the other levels of the time series hierarchy. Each of the level pipelines can be a respective subpart of the overall forecasting pipeline. The operations can include executing the level pipelines for the plurality of levels of the time series hierarchy to generate a plurality of forecasts. Each forecast of the plurality of forecasts can correspond to a respective level of the time series hierarchy. The operations can include executing a reconciliation process on the plurality of forecasts to generate a plurality of reconciled forecasts for the plurality of levels of the time series hierarchy. Each reconciled forecast of the plurality of reconciled forecasts can correspond to a respective forecast of the plurality of forecasts. The operations can include generating a visualization of a reconciled forecast of the plurality of reconciled forecasts.

Still another example of the present disclosure includes a non-transitory computer-readable medium comprising program code that is executable by one or more processors for causing the one or more processors to perform operations. The operations can include generating a graphical user interface (GUI) for a piece of forecasting software, wherein the GUI includes a drag-and-drop canvas comprising a set of graphical nodes arranged to define an overall forecasting pipeline. Each node in the set of graphical nodes can correspond to a respective operation in the overall forecasting pipeline. The operations can include, based on a user input, attaching a hierarchical modeling node to the set of graphical nodes on the drag-and-drop canvas. The hierarchical modeling node can enable a user to define a time series hierarchy comprising a plurality of levels. The hierarchical modeling node can enable one or more users to customize separate level pipelines for each level of the time series hierarchy independently of the other level pipelines for the other levels of the time series hierarchy. Each of the level pipelines can be a respective subpart of the overall forecasting pipeline. The operations can include executing the level pipelines for the plurality of levels of the time series hierarchy to generate a plurality of forecasts. Each forecast of the plurality of forecasts can correspond to a respective level of the time series hierarchy. The operations can include executing a reconciliation process on the plurality of forecasts to generate a plurality of reconciled forecasts for the plurality of levels of the time series hierarchy. Each reconciled forecast of the plurality of reconciled forecasts can correspond to a respective forecast of the plurality of forecasts. The operations can include generating a visualization of a reconciled forecast of the plurality of reconciled forecasts.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

BRIEF DESCRIPTION OF THE DRAWINGS

The present disclosure is described in conjunction with the appended figures.

Figure 1:
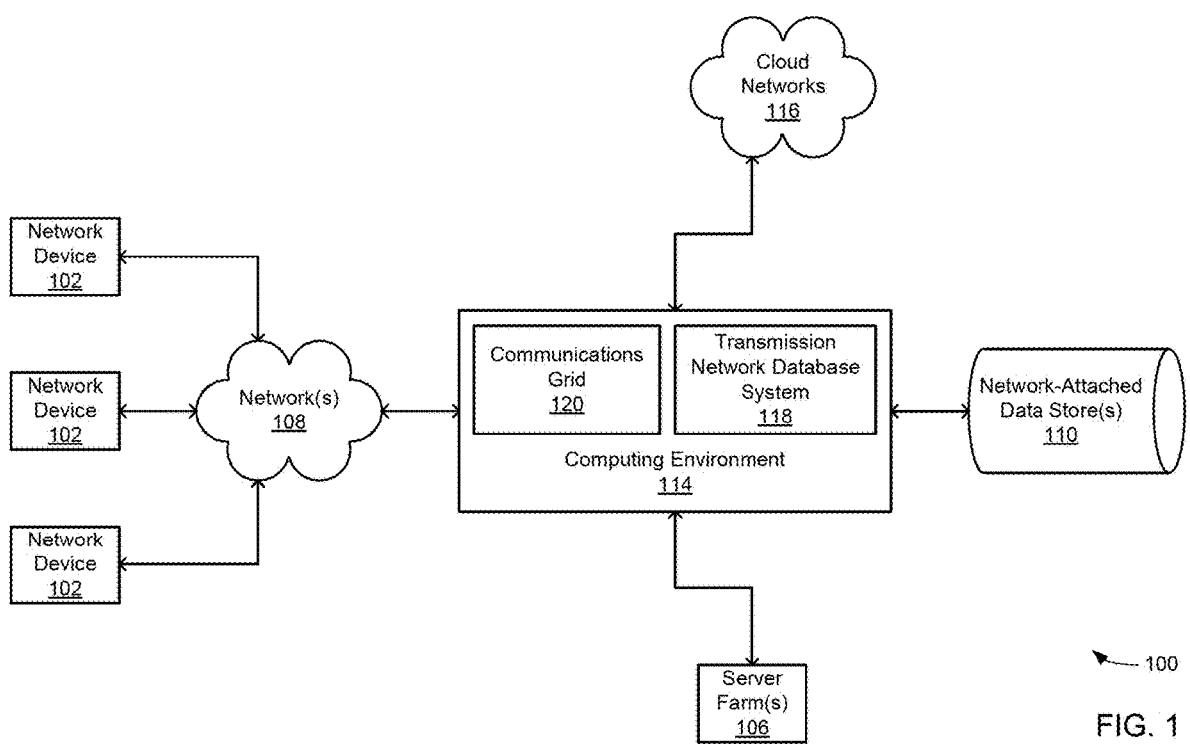
FIG. 1 shows an example of the hardware components of a data transmission network according to some aspects of the present disclosure.

In the appended figures, similar components or features can have the same reference number. Further, various components of the same type may be distinguished by following the reference number with a lowercase letter that distinguishes among the similar components. If only the first reference number is used in the specification, the description is applicable to any one of the similar components having the same first reference number irrespective of the lowercase letter.

DETAILED DESCRIPTION

Visual forecasting software can be used to quickly and automatically generate forecasts based on historical input time series data. Such software can include a graphical user interface (GUI) that may have a drag-and-drop canvas on which a set of graphical nodes can be arranged and connected to define a forecasting "pipeline." Each graphical node can represent a processing operation or collection of processing operations. For example, the graphical nodes can provide operations relating to data hygiene, forecasting model selection, forecasting, post-processing analyses, and so on. Each graphical node represents a step in the process flow defined by the forecasting pipeline. The user can selectively add or remove nodes to the pipeline to customize how the input data is processed, which modeling techniques are used, etc.

The present disclosure introduces a new type of graphical node and its corresponding functionality to such visual forecasting GUIs. This new type of node is referred to herein as a "hierarchical modeling node." A user can add this node to the forecasting pipeline, either in place of or alongside other graphical nodes. The hierarchical modeling node can allow the user to create a custom time series hierarchy based on the input data. A time series hierarchy can be a collection of time series that are organized in a hierarchical structure, where the lower levels of the hierarchy can aggregate up to the higher levels of the hierarchy. After the hierarchy has been specified, the system can automatically create a default level pipeline for each hierarchy level. A level pipeline is a pipeline designed for a specific level of the time series hierarchy and is distinct from the overall forecasting pipeline, which includes all the level pipelines. The level pipelines for the hierarchical levels are separate from one another, individually accessible, and individually customizable. The level pipelines can be arranged serially or in parallel throughout the overall pipeline. After the default level pipelines have been automatically generated for the time series hierarchy, they can be accessed through the hierarchical modeling node and customized as desired.

In particular, a user can select the hierarchical modeling node to view information about the time series hierarchy. In response, the user is presented with a summary of the levels in the corresponding time series hierarchy. From the summary view, the user can select the level pipeline of any level to open it on a drag-and-drop canvas. Here, the user can add or remove nodes to customize the steps that will be applied to the aggregated time series at the given level. In some examples, the user can add a "Save Data" node to persist the aggregated data produced for the given level on a persistent storage device, such as a hard drive. Also, the user can add and open an "Interactive Modeling" node to create and apply custom models for the aggregated time series at the given level.

Because the level pipelines are separate from one another, users can work concurrently on different level pipelines. The level pipeline of any level can also be run individually, without interfering with the state of the other level pipelines. For convenience, all level pipelines may also be run at once (e.g., in parallel)—e.g., either from the summary view or by running the main overall forecasting pipeline.

In some examples, the system can monitor the status of all level pipelines and automatically initiate a reconciliation process once all their runs are completed. A reconciliation process is a post-processing method that ensures the forecasts of multivariate time series adhere to predefined constraints (e.g., known linear constraints). For example, the sum of regional unemployment forecasts should be equal to the national unemployment forecast. If any level pipeline is modified while the reconciliation process is ongoing, the system can detect it and automatically cancel the reconciliation process to save time and avoid expensive computations on stale data.

To ensure that only fully reconciled data is made available to downstream consumers, the system can derive the status of the overall forecasting pipeline from the combined statuses of the level pipelines and the reconciliation process. In some examples, the overall forecasting pipeline can be marked "completed" only once the reconciliation process has been completed successfully. In the meantime, the system can set the main overall forecasting pipeline's status to "modified" if any level pipeline is modified, "running" if any level pipeline or the reconciliation process is running, etc.

After the reconciliation process is completed, the user can review and explore the generated data. The user can view the data for one level at a time and can switch between the hierarchy levels. The user can also apply a filter to list a subset of matching aggregated time series. In some examples, the distribution of the reconciled data can be displayed in an envelope plot. The user can also view reconciled forecasts for the selected aggregated time series in comparison to the actual values and/or predicted values prior to reconciliation.

At some point, the user may decide to modify the time series hierarchy. Based on such a modification, the system can automatically remove obsolete level pipelines and create new level pipelines for any new levels that were added. The level pipelines that were neither added nor removed are maintained to preserve the user's work, even if the order of the level within the hierarchy was changed. The maintained level pipelines may be marked as "modified" and can process the aggregated data for their new position within the hierarchy on the next run.

In some examples, the user can include multiple hierarchical modeling nodes in a single overall forecasting pipeline. Each of the hierarchical modeling nodes can define a different time series hierarchy. By tying each hierarchy to one of the hierarchical modeling nodes, the user is not limited to only one time series hierarchy for the entire project, which improves flexibility. In some examples, the system can validate that the lowest level of each of the hierarchies includes all the time series present in the input data. This can ensure an apples-to-apples comparison between the outputs of the hierarchies and non-hierarchical nodes.

With the hierarchical modeling node, the present disclosure provides a new graphical user interface component that allows users to easily define time series hierarchies and custom pipelines for each level of a hierarchy. This can significantly increase the degree to which forecasting pipelines can be customized, allowing for new and more complex forecasting pipelines to be created.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
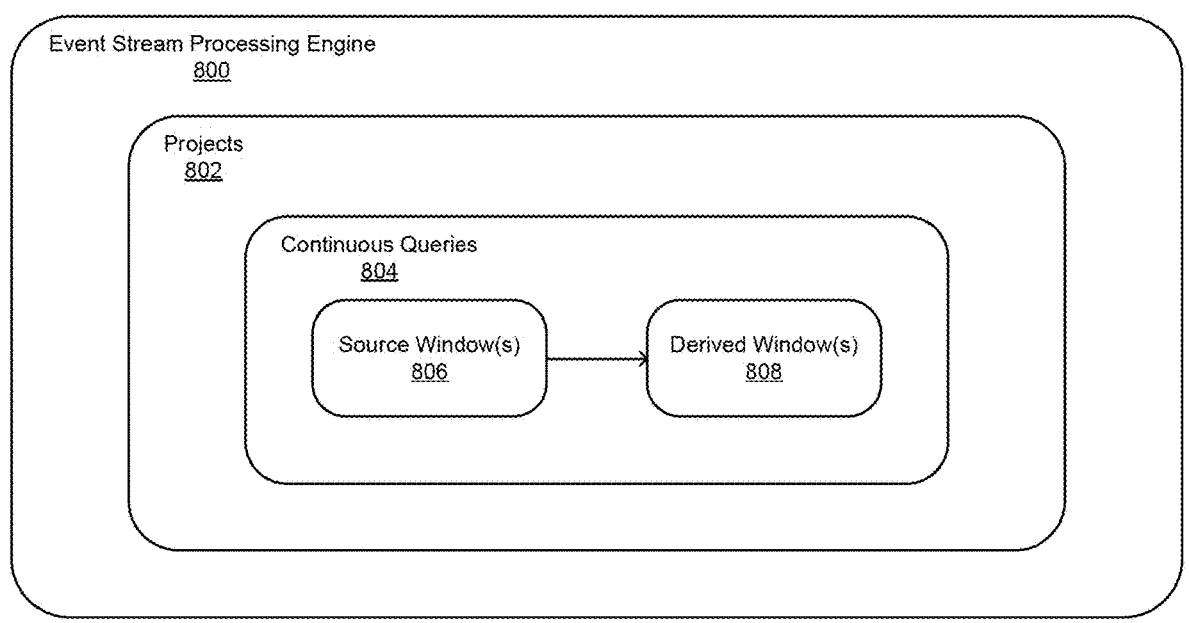
FIG. 8 shows a block diagram including components of an Event Stream Processing Engine (ESPE) according to some aspects of the present disclosure.
Figure 9:
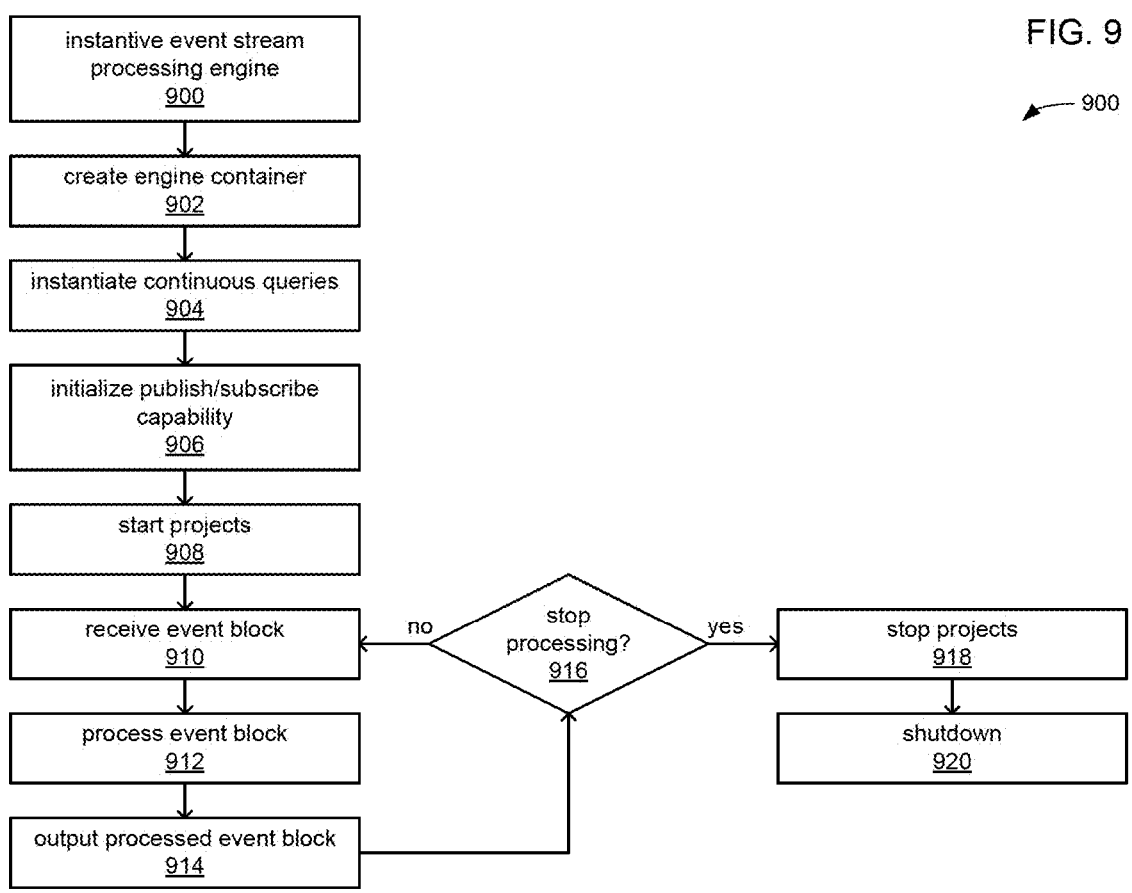
FIG. 9 shows a flow chart of an example process including operations performed by an event stream processing engine according to some aspects of the present disclosure.
Figure 10:
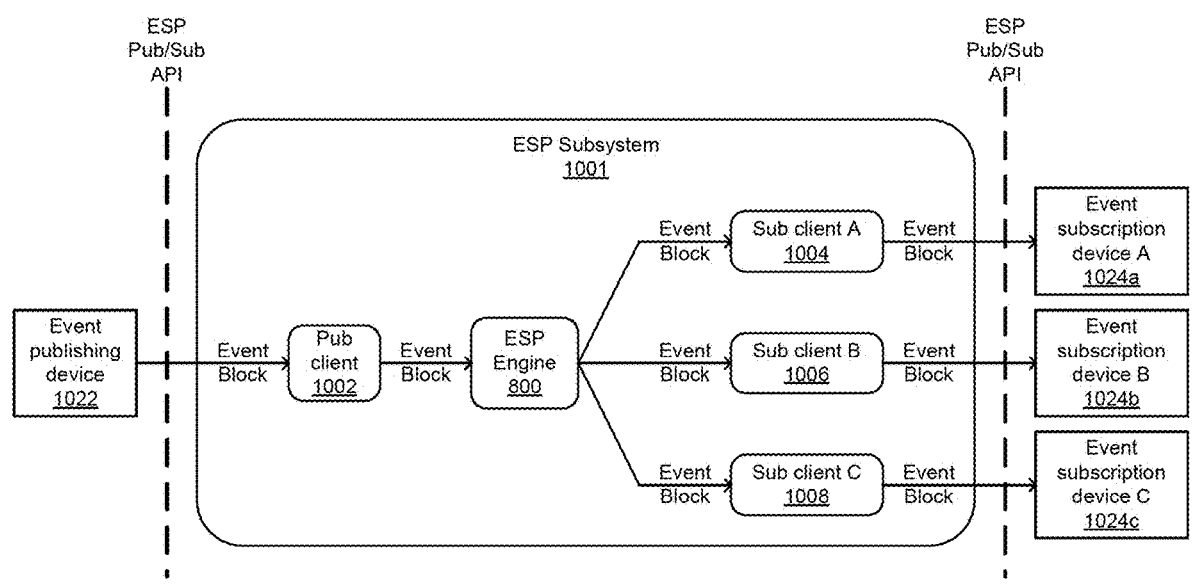
FIG. 10 shows an ESP system interfacing between publishing device and event subscribing devices according to some aspects of the present disclosure.

In other embodiments, network devices 102 may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices 102 may include local area network devices, such as routers, hubs, switches, or other computer networking devices. These devices may provide a variety of stored or generated data, such as network data or data specific to the network devices themselves. Network devices 102 may also include sensors that monitor their environment or other devices to collect data regarding that environment or those devices, and such network devices may provide data they collect overtime. Network devices 102 may also include devices within the internet of things, such as devices within a home automation network. Some of these devices may be referred to as edge devices, and may involve edge computing circuitry. Data may be transmitted by network devices 102 directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However, in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores 110 may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing or containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, and network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more server farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices 102, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLUETOOTH® communication channel or a BLUETOOTH® Low Energy communication channel. A wired network may include a wired interface. The wired and/or wireless networks may be implemented using routers, access points, bridges, gateways, or the like, to connect devices in the network 108, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
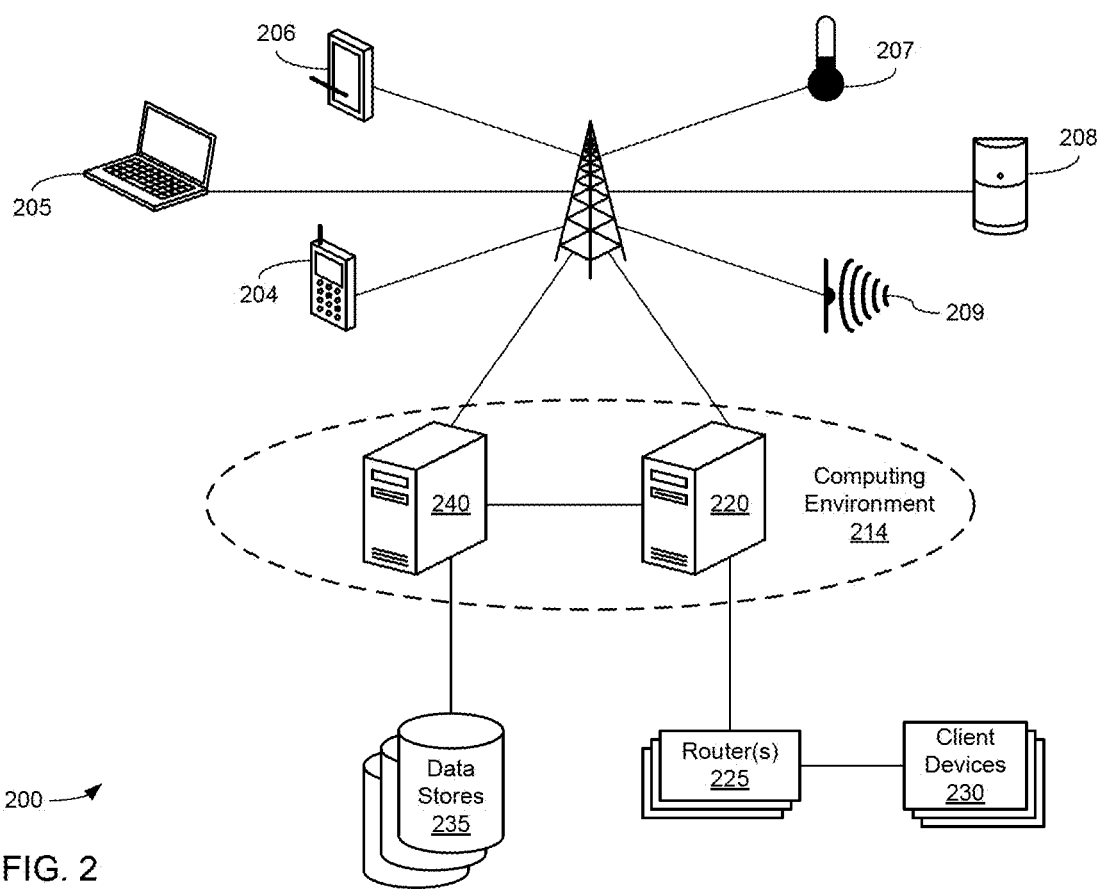
FIG. 2 shows an example network including an example set of devices communicating with each other over an exchange system according to some aspects of the present disclosure.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station). The communication can be routed to another network device, such as network devices 205-209, via base station. The communication can also be routed to computing environment 214 via base station. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting characteristics of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc., and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data they collect before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other internetwork or intra-network connection components. For example, computing environment 214 may communicate with client devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a machine 240 that is a web server. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments.

Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
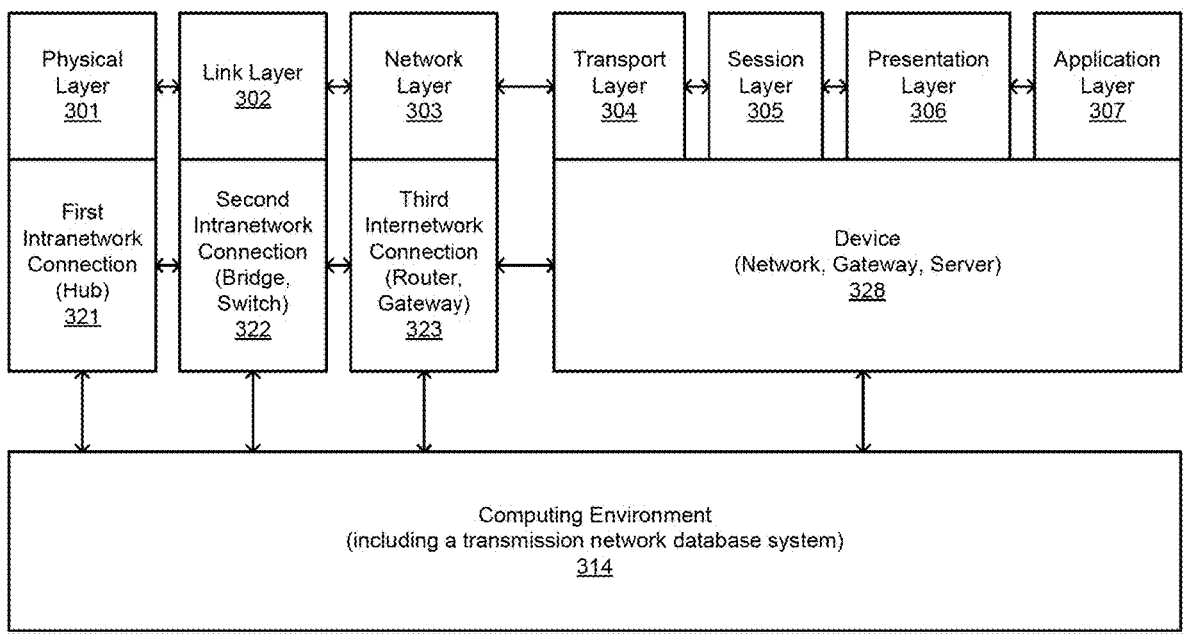
FIG. 3 shows an example representation of a conceptual model of a communications protocol system according to some aspects of the present disclosure.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 301. Physical layer 301 represents physical communication, and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in a same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network. In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users, and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Inter-network connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
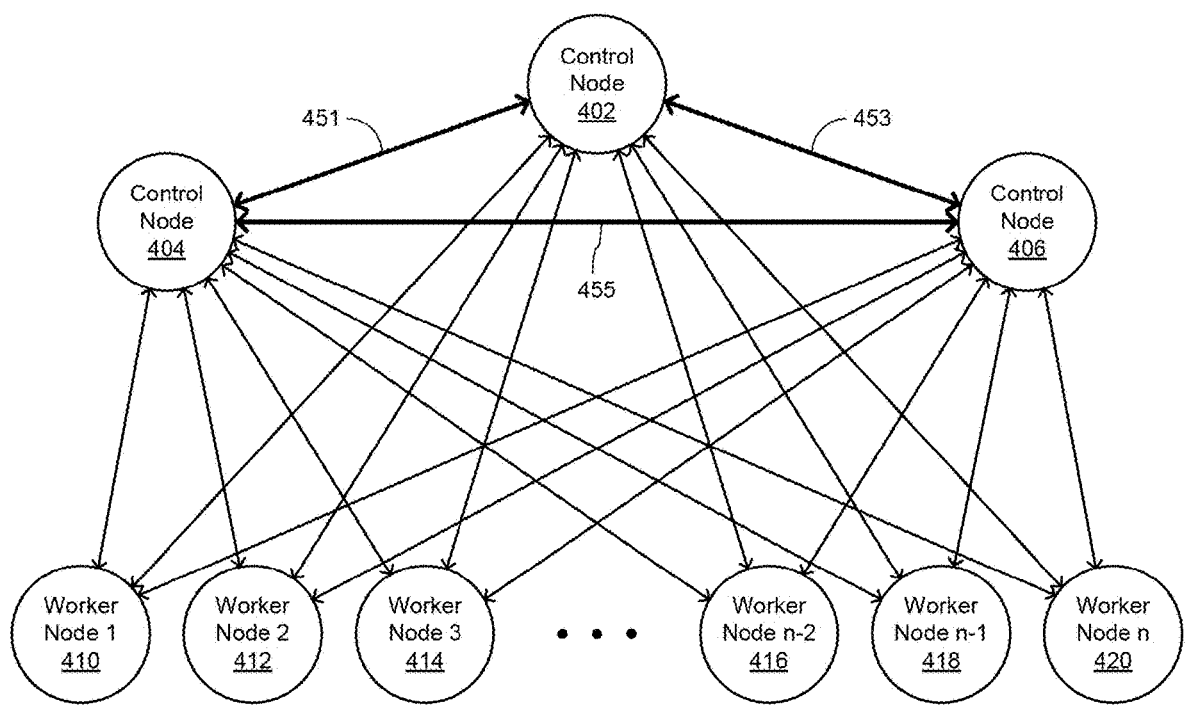
FIG. 4 shows a communications grid computing system including a variety of control and worker nodes according to some aspects of the present disclosure.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® Distributed File System, or HDFS).

Control nodes may maintain knowledge of the status of the nodes in the grid (i.e., grid status information), accept work requests from clients, subdivide the work across worker nodes, and coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project codes running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local to (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks), then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, and the port number on which the primary control node is accepting connections from peer nodes, among others. The information may also be provided in a configuration file, transmitted over a secure shell tunnel, or received from a configuration server, among others.

While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, and information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
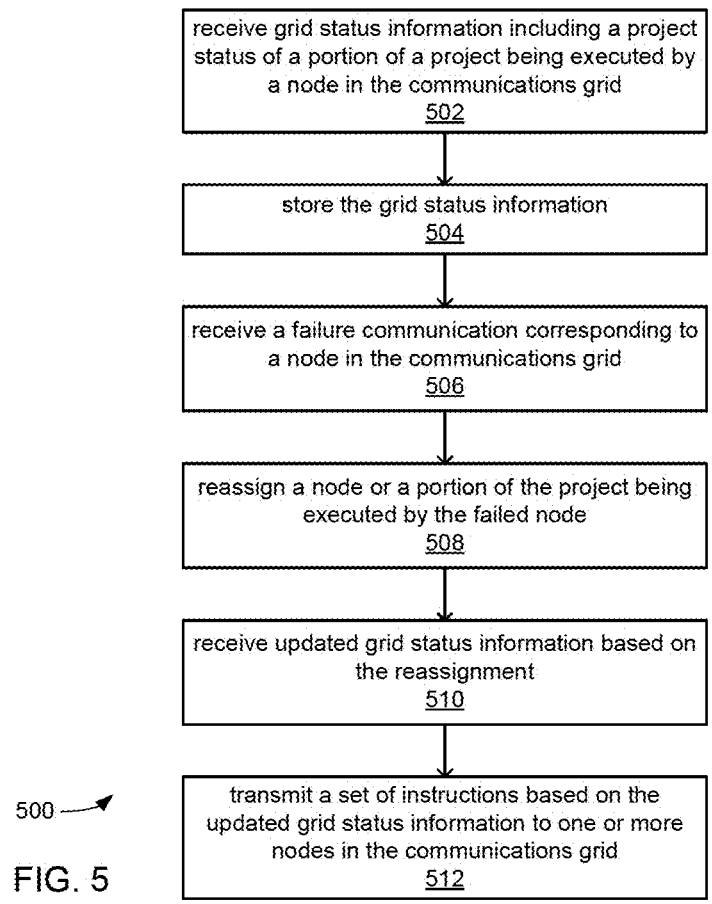
FIG. 5 shows a flow chart showing an example process for adjusting a communications grid or a work project in a communications grid after a failure of a node according to some aspects of the present disclosure.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
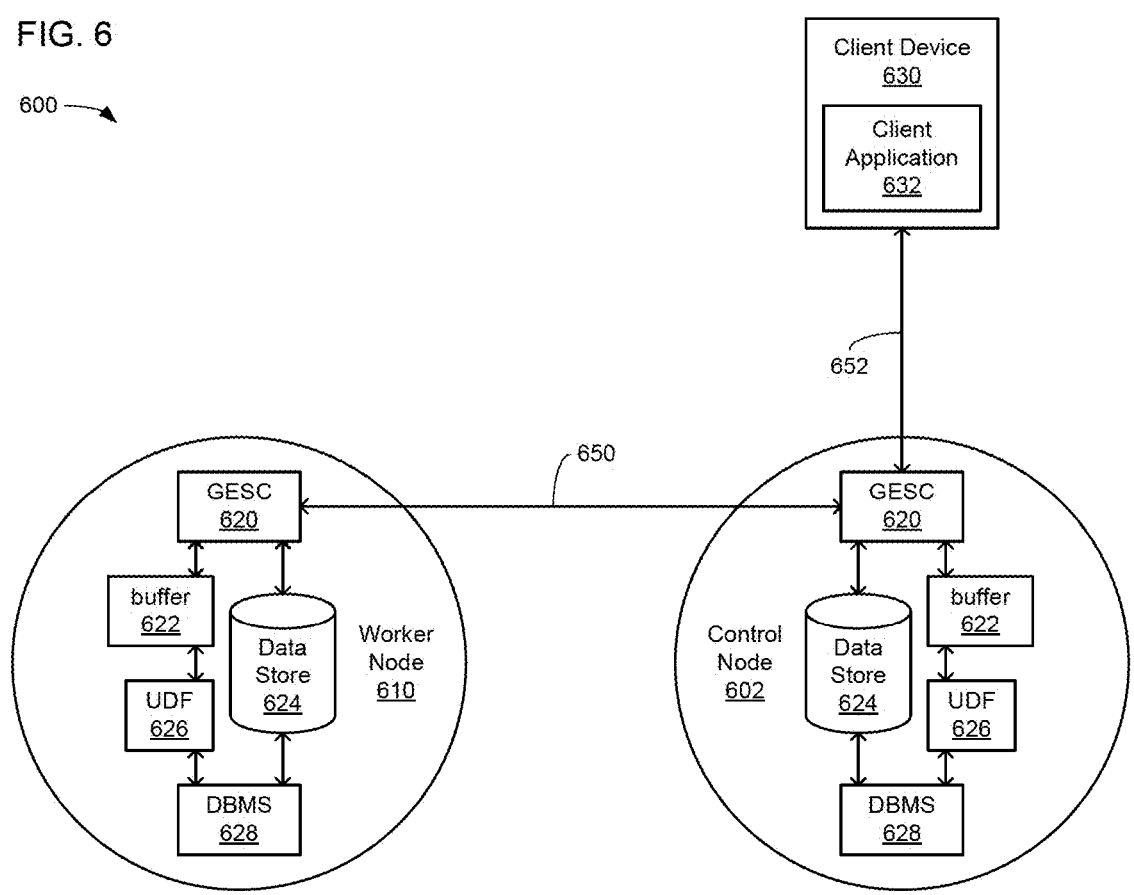
FIG. 6 shows a portion of a communications grid computing system including a control node and a worker node according to some aspects of the present disclosure.

FIG. 6 illustrates a portion of a communications grid computing system 600 including a control node and a worker node, according to embodiments of the present technology. Communications grid computing system 600 includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DBMS 628 to transfer data to or receive data from the database stored in the data stores 624 that are managed by the DBMS 628. For example, UDF 626 can be invoked by the DBMS 628 to provide data to the GESC 620 for processing. The UDF 626 may establish a socket connection (not shown) with the GESC 620 to transfer the data. Alternatively, the UDF 626 can transfer data to the GESC 620 by writing data to shared memory accessible by both the UDF 626 and the GESC 620

The GESC 620 at the nodes 602 and 610 may be connected via a network, such as network 108 shown in FIG. 1. Therefore, nodes 602 and 610 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DBMS 628 may control the creation, maintenance, and use of database or data structure (not shown) within a nodes 602 or 610. The database may organize data stored in data stores 624. The DBMS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
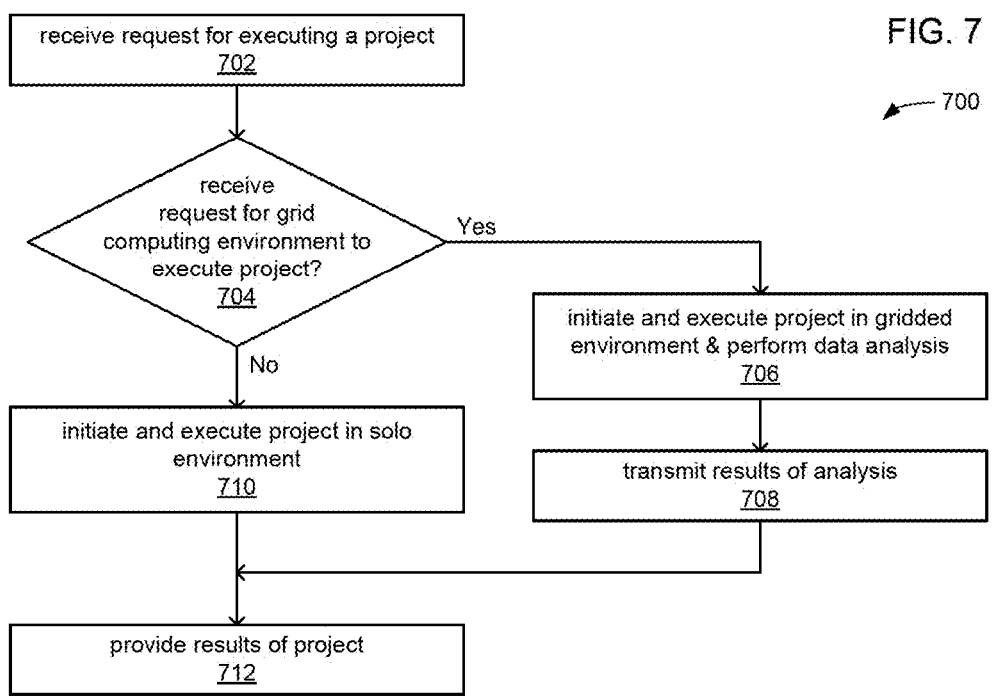
FIG. 7 shows a flow chart showing an example method 700 for executing a project within a grid computing system according to some aspects of the present disclosure.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024*a-c*, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024*a-c*, according to embodiments of the present technology. ESP system 1000 may include ESP device or subsystem 1001, event publishing device 1022, an event subscribing device A 1024*a*, an event subscribing device B 1024*b*, and an event subscribing device C 1024*c*. Input event streams are output to ESP subsystem 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024*a*, event subscribing device B 1024*b*, and event subscribing device C 1024*c*. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024a, event subscribing device B 1024b, and event subscribing device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024a, event subscribing device B 1024b, and event subscribing device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 1001 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024a using the publish/subscribe API. Subscribing client B 1006 may be started by an event subscription application B executing at event subscribing device B 1024b using the publish/subscribe API. Subscribing client C 1008 may be started by an event subscription application C executing at event subscribing device C 1024c using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024a-c. For example, subscribing client A 1004, subscribing client B 1006, and subscribing client C 1008 may send the received event block object to event subscription device A 1024a, event subscription device B 1024b, and event subscription device C 1024c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
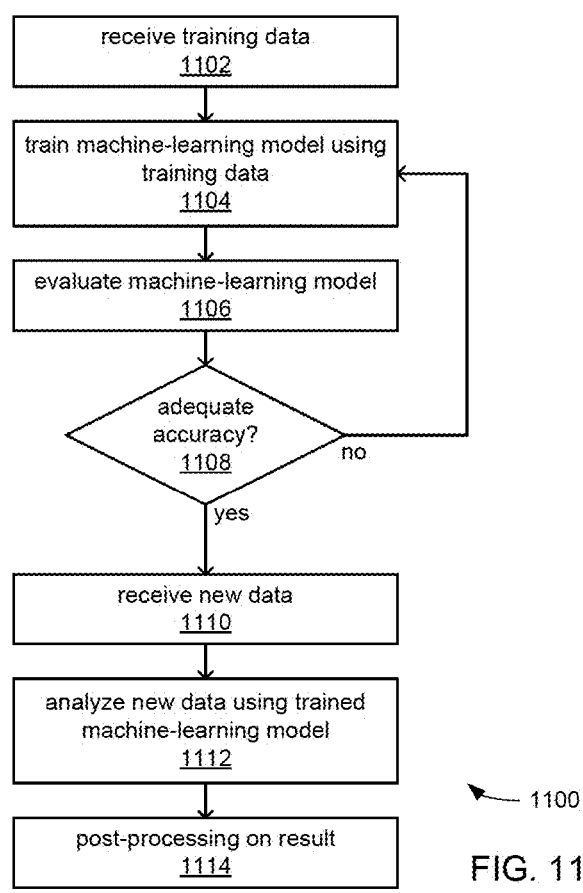
FIG. 11 shows a flow chart of an example of a process for generating and using a machine-learning model according to some aspects of the present disclosure.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, North Carolina.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1102, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1104, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1106, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if, at block 1108, the machine-learning model has an inadequate degree of accuracy for a particular task, the process can return to block 1104, where the machine-learning model can be further trained using additional training data or otherwise modified to improve accuracy. However, if, at block 1108, the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
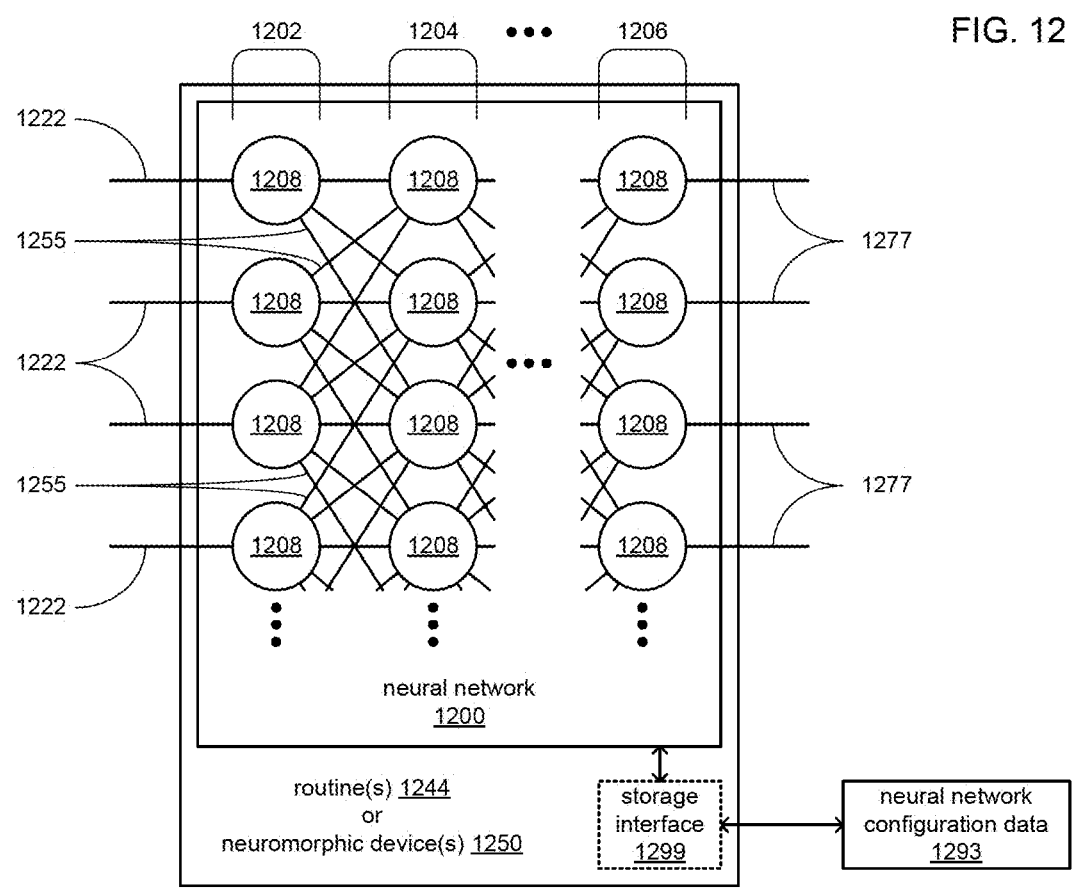
FIG. 12 shows a node-link diagram of an example of a neural network according to some aspects of the present disclosure.

A more specific example of a machine-learning model is the neural network 1200 shown in FIG. 12. The neural network 1200 is represented as multiple layers of neurons 1208 that can exchange data between one another via connections 1255 that may be selectively instantiated thereamong. The layers include an input layer 1202 for receiving input data provided at inputs 1222, one or more hidden layers 1204, and an output layer 1206 for providing a result at outputs 1277. The hidden layer(s) 1204 are referred to as hidden because they may not be directly observable or have their inputs or outputs directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons 1208 and connections 1255 thereamong may have numeric weights, which can be tuned during training of the neural network 1200. For example, training data can be provided to at least the inputs 1222 to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 at the outputs 1277 and a desired output of the neural network 1200. Based on the gradient, one or more numeric weights of the neural network 1200 can be updated to reduce the difference therebetween, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, the connections 1255 are instantiated and/or weighted so that every neuron 1208 only propagates an output value to a subsequent layer of the neural network 1200. For example, data may only move one direction (forward) from one neuron 1208 to the next neuron 1208 in a feed-forward neural network. Such a "forward" direction may be defined as proceeding from the input layer 1202 through the one or more hidden layers 1204, and toward the output layer 1206.

In other examples, the neural network 1200 may be a recurrent neural network. A recurrent neural network can include one or more feedback loops among the connections 1255, thereby allowing data to propagate in both forward and backward through the neural network 1200. Such a "backward" direction may be defined as proceeding in the opposite direction of forward, such as from the output layer 1206 through the one or more hidden layers 1204, and toward the input layer 1202. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer ("subsequent" in the sense of moving "forward") of the neural network 1200. Each subsequent layer of the neural network 1200 can repeat this process until the neural network 1200 outputs a final result at the outputs 1277 of the output layer 1206. For example, the neural network 1200 can receive a vector of numbers at the inputs 1222 of the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation $y=\max(x, 0)$ where y is the output and x is an input value from the weighted vector. The transformed output can be supplied to a subsequent layer (e.g., a hidden layer 1204) of the neural network 1200. The subsequent layer of the neural network 1200 can receive the transformed output, multiply the transformed output by a matrix of numeric weights and a nonlinearity, and provide the result to yet another layer of the neural network 1200 (e.g., another, subsequent, hidden layer 1204). This process continues until the neural network 1200 outputs a final result at the outputs 1277 of the output layer 1206.

As also depicted in FIG. 12, the neural network 1200 may be implemented either through the execution of the instructions of one or more routines 1244 by central processing units (CPUs), or through the use of one or more neuromorphic devices 1250 that incorporate a set of memristors (or other similar components) that each function to implement one of the neurons 1208 in hardware. Where multiple neuromorphic devices 1250 are used, they may be interconnected in a depth-wise manner to enable implementing neural networks with greater quantities of layers, and/or in a width-wise manner to enable implementing neural networks having greater quantities of neurons 1208 per layer.

The neuromorphic device 1250 may incorporate a storage interface 1299 by which neural network configuration data 1293 that is descriptive of various parameters and hyperparameters of the neural network 1200 may be stored and/or retrieved. More specifically, the neural network configuration data 1293 may include such parameters as weighting and/or biasing values derived through the training of the neural network 1200, as has been described. Alternatively or additionally, the neural network configuration data 1293 may include such hyperparameters as the manner in which the neurons 1208 are to be interconnected (e.g., feedforward or recurrent), the trigger function to be implemented within the neurons 1208, the quantity of layers and/or the overall quantity of the neurons 1208. The neural network configuration data 1293 may provide such information for more than one neuromorphic device 1250 where multiple ones have been interconnected to support larger neural networks.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. These processors may also be employed in heterogeneous computing architectures with a number of and/or a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
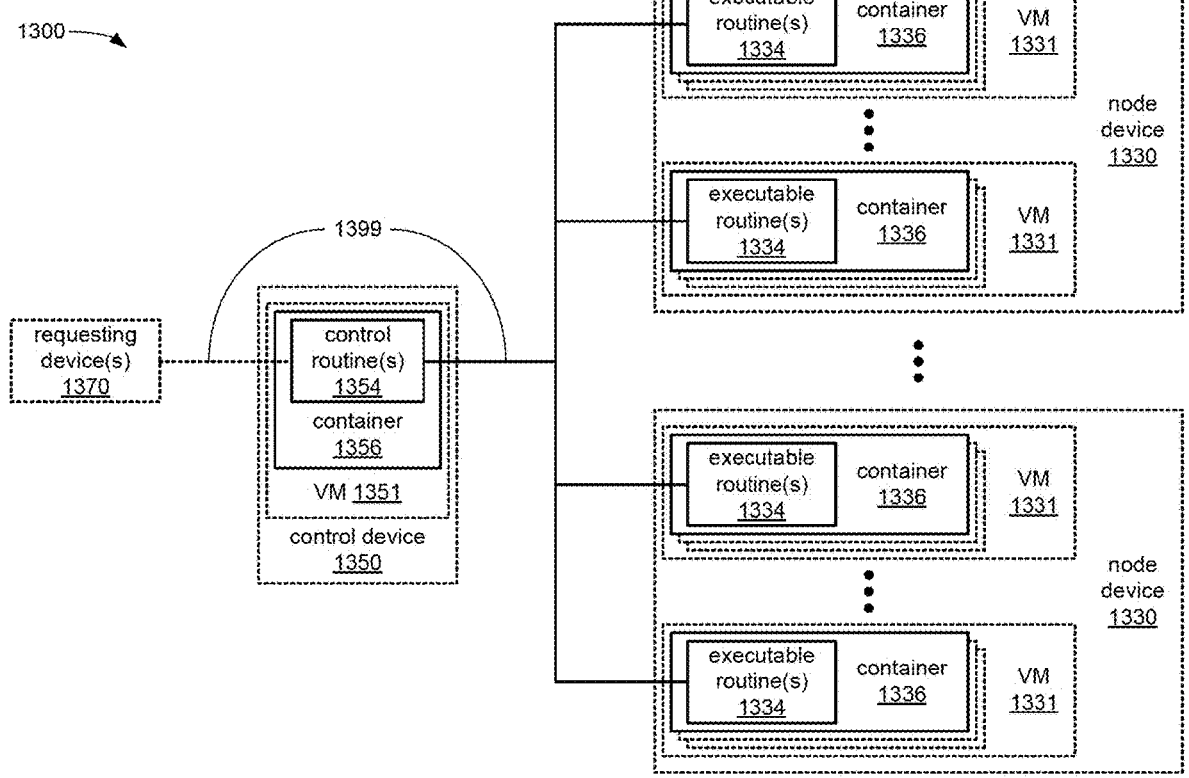
FIG. 13 shows various aspects of the use of containers as a mechanism to allocate processing, storage and/or other resources of a processing system to the performance of various analyses according to some aspects of the present disclosure.

FIG. 13 illustrates various aspects of the use of containers 1336 as a mechanism to allocate processing, storage and/or other resources of a processing system 1300 to the performance of various analyses. More specifically, in a processing system 1300 that includes one or more node devices 1330 (e.g., the aforementioned grid system 400), the processing, storage and/or other resources of each node device 1330 may be allocated through the instantiation and/or maintenance of multiple containers 1336 within the node devices 1330 to support the performance(s) of one or more analyses. As each container 1336 is instantiated, predetermined amounts of processing, storage and/or other resources may be allocated thereto as part of creating an execution environment therein in which one or more executable routines 1334 may be executed to cause the performance of part or all of each analysis that is requested to be performed.

It may be that at least a subset of the containers 1336 are each allocated a similar combination and amounts of resources so that each is of a similar configuration with a similar range of capabilities, and therefore, are interchangeable. This may be done in embodiments in which it is desired to have at least such a subset of the containers 1336 already instantiated prior to the receipt of requests to perform analyses, and thus, prior to the specific resource requirements of each of those analyses being known.

Alternatively or additionally, it may be that at least a subset of the containers 1336 are not instantiated until after the processing system 1300 receives requests to perform analyses where each request may include indications of the resources required for one of those analyses. Such information concerning resource requirements may then be used to guide the selection of resources and/or the amount of each resource allocated to each such container 1336. As a result, it may be that one or more of the containers 1336 are caused to have somewhat specialized configurations such that there may be differing types of containers to support the performance of different analyses and/or different portions of analyses.

It may be that the entirety of the logic of a requested analysis is implemented within a single executable routine 1334. In such embodiments, it may be that the entirety of that analysis is performed within a single container 1336 as that single executable routine 1334 is executed therein. However, it may be that such a single executable routine 1334, when executed, is at least intended to cause the instantiation of multiple instances of itself that are intended to be executed at least partially in parallel. This may result in the execution of multiple instances of such an executable routine 1334 within a single container 1336 and/or across multiple containers 1336.

Alternatively or additionally, it may be that the logic of a requested analysis is implemented with multiple differing executable routines 1334. In such embodiments, it may be that at least a subset of such differing executable routines 1334 are executed within a single container 1336. However, it may be that the execution of at least a subset of such differing executable routines 1334 is distributed across multiple containers 1336.

Where an executable routine 1334 of an analysis is under development, and/or is under scrutiny to confirm its functionality, it may be that the container 1336 within which that executable routine 1334 is to be executed is additionally configured assist in limiting and/or monitoring aspects of the functionality of that executable routine 1334. More specifically, the execution environment provided by such a container 1336 may be configured to enforce limitations on accesses that are allowed to be made to memory and/or 1/O addresses to control what storage locations and/or I/O devices may be accessible to that executable routine 1334. Such limitations may be derived based on comments within the programming code of the executable routine 1334 and/or other information that describes what functionality the executable routine 1334 is expected to have, including what memory and/or 1/O accesses are expected to be made when the executable routine 1334 is executed. Then, when the executable routine 1334 is executed within such a container 1336, the accesses that are attempted to be made by the executable routine 1334 may be monitored to identify any behavior that deviates from what is expected.

Where the possibility exists that different executable routines 1334 may be written in different programming languages, it may be that different subsets of containers 1336 are configured to support different programming languages. In such embodiments, it may be that each executable routine 1334 is analyzed to identify what programming language it is written in, and then what container 1336 is assigned to support the execution of that executable routine 1334 may be at least partially based on the identified programming language. Where the possibility exists that a single requested analysis may be based on the execution of multiple executable routines 1334 that may each be written in a different programming language, it may be that at least a subset of the containers 1336 are configured to support the performance of various data structure and/or data format conversion operations to enable a data object output by one executable routine 1334 written in one programming language to be accepted as an input to another executable routine 1334 written in another programming language.

As depicted, at least a subset of the containers 1336 may be instantiated within one or more VMs 1331 that may be instantiated within one or more node devices 1330. Thus, in some embodiments, it may be that the processing, storage and/or other resources of at least one node device 1330 may be partially allocated through the instantiation of one or more VMs 1331, and then in turn, may be further allocated within at least one VM 1331 through the instantiation of one or more containers 1336.

In some embodiments, it may be that such a nested allocation of resources may be carried out to effect an allocation of resources based on two differing criteria. By way of example, it may be that the instantiation of VMs 1331 is used to allocate the resources of a node device 1330 to multiple users or groups of users in accordance with any of a variety of service agreements by which amounts of processing, storage and/or other resources are paid for each such user or group of users. Then, within each VM 1331 or set of VMs 1331 that is allocated to a particular user or group of users, containers 1336 may be allocated to distribute the resources allocated to each VM 1331 among various analyses that are requested to be performed by that particular user or group of users.

As depicted, where the processing system 1300 includes more than one node device 1330, the processing system 1300 may also include at least one control device 1350 within which one or more control routines 1354 may be executed to control various aspects of the use of the node device(s) 1330 to perform requested analyses. By way of example, it may be that at least one control routine 1354 implements logic to control the allocation of the processing, storage and/or other resources of each node device 1330 to each VM 1331 and/or container 1336 that is instantiated therein. Thus, it may be the control device(s) 1350 that effects a nested allocation of resources, such as the aforementioned example allocation of resources based on two differing criteria.

As also depicted, the processing system 1300 may also include one or more distinct requesting devices 1370 from which requests to perform analyses may be received by the control device(s) 1350. Thus, and by way of example, it may be that at least one control routine 1354 implements logic to monitor for the receipt of requests from authorized users and/or groups of users for various analyses to be performed using the processing, storage and/or other resources of the node device(s) 1330 of the processing system 1300. The control device(s) 1350 may receive indications of the availability of resources, the status of the performances of analyses that are already underway, and/or still other status information from the node device(s) 1330 in response to polling, at a recurring interval of time, and/or in response to the occurrence of various preselected events. More specifically, the control device(s) 1350 may receive indications of status for each container 1336, each VM 1331 and/or each node device 1330. At least one control routine 1354 may implement logic that may use such information to select container(s) 1336, VM(s) 1331 and/or node device(s) 1330 that are to be used in the execution of the executable routine(s) 1334 associated with each requested analysis.

As further depicted, in some embodiments, the one or more control routines 1354 may be executed within one or more containers 1356 and/or within one or more VMs 1351 that may be instantiated within the one or more control devices 1350. It may be that multiple instances of one or more varieties of control routine 1354 may be executed within separate containers 1356, within separate VMs 1351 and/or within separate control devices 1350 to better enable parallelized control over parallel performances of requested analyses, to provide improved redundancy against failures for such control functions, and/or to separate differing ones of the control routines 1354 that perform different functions. By way of example, it may be that multiple instances of a first variety of control routine 1354 that communicate with the requesting device(s) 1370 are executed in a first set of containers 1356 instantiated within a first VM 1351, while multiple instances of a second variety of control routine 1354 that control the allocation of resources of the node device(s) 1330 are executed in a second set of containers 1356 instantiated within a second VM 1351. It may be that the control of the allocation of resources for performing requested analyses may include deriving an order of performance of portions of each requested analysis based on such factors as data dependencies thereamong, as well as allocating the use of containers 1336 in a manner that effectuates such a derived order of performance.

Where multiple instances of control routine 1354 are used to control the allocation of resources for performing requested analyses, such as the assignment of individual ones of the containers 1336 to be used in executing executable routines 1334 of each of multiple requested analyses, it may be that each requested analysis is assigned to be controlled by just one of the instances of control routine 1354. This may be done as part of treating each requested analysis as one or more "ACID transactions" that each have the four properties of atomicity, consistency, isolation and durability such that a single instance of control routine 1354 is given full control over the entirety of each such transaction to better ensure that all of each such transaction is either entirely performed or is entirely not performed. Allowing partial performances to occur may cause cache incoherencies and/or data corruption issues.

As additionally depicted, the control device(s) 1350 may communicate with the requesting device(s) 1370 and with the node device(s) 1330 through portions of a network 1399 extending thereamong. Again, such a network as the depicted network 1399 may be based on any of a variety of wired and/or wireless technologies, and may employ any of a variety of protocols by which commands, status, data and/or still other varieties of information may be exchanged. It may be that one or more instances of a control routine 1354 cause the instantiation and maintenance of a web portal or other variety of portal that is based on any of a variety of communication protocols, etc. (e.g., a restful API). Through such a portal, requests for the performance of various analyses may be received from requesting device(s) 1370, and/or the results of such requested analyses may be provided thereto. Alternatively or additionally, it may be that one or more instances of a control routine 1354 cause the instantiation of and maintenance of a message passing interface and/or message queues. Through such an interface and/or queues, individual containers 1336 may each be assigned to execute at least one executable routine 1334 associated with a requested analysis to cause the performance of at least a portion of that analysis.

Although not specifically depicted, it may be that at least one control routine 1354 may include logic to implement a form of management of the containers 1336 based on the Kubernetes container management platform promulgated by Could Native Computing Foundation of San Francisco, CA, USA. In such embodiments, containers 1336 in which executable routines 1334 of requested analyses may be instantiated within "pods" (not specifically shown) in which other containers may also be instantiated for the execution of other supporting routines. Such supporting routines may cooperate with control routine(s) 1354 to implement a communications protocol with the control device(s) 1350 via the network 1399 (e.g., a message passing interface, one or more message queues, etc.). Alternatively or additionally, such supporting routines may serve to provide access to one or more storage repositories (not specifically shown) in which at least data objects may be stored for use in performing the requested analyses.

Figure 14:
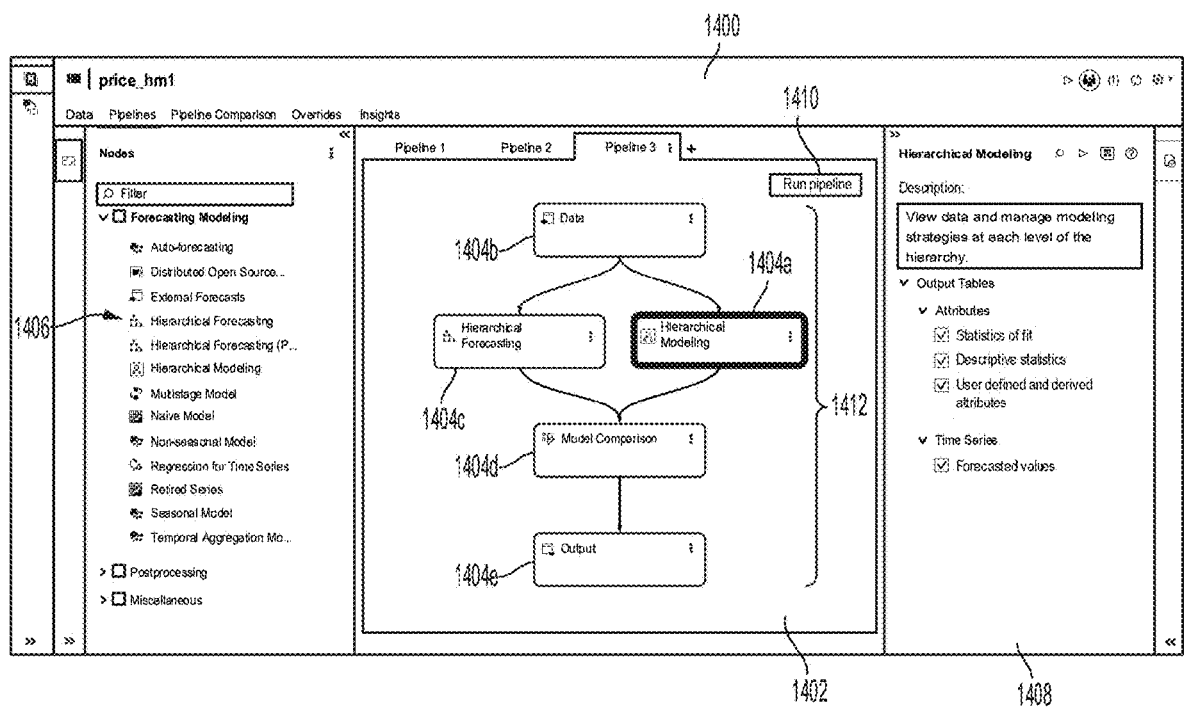
FIG. 14 shows an example of a drag-and-drop canvas with a hierarchical modeling node according to some aspects of the present disclosure.

FIG. 14 shows an example of a drag-and-drop canvas 1402 with a hierarchical modeling node 1404a according to some aspects of the present disclosure. The drag-and-drop canvas 1402 is part of a graphical user interface 1400 for forecasting software. A user can select nodes 1404a-e from a library 1406 of nodes and arrange them as desired on the canvas 1402 to define an overall forecasting pipeline 1412. Each of the nodes 1404a-e may have corresponding functionality that can be accessed and customized by selecting the node in the graphical user interface 1400. For example, in response to the user single-clicking the hierarchical modeling node 1404a, the graphical user interface 1400 can display a frame 1408 with additional details and settings for the hierarchical modeling node 1404a, with which the user can interact to customize the hierarchical modeling node 1404a. Additionally, in response to the user double-clicking the hierarchical modeling node 1404a, a new window or frame may be displayed that has additional settings and features with which the user may interact to further configure the hierarchical modeling node 1404a.

Figure 15:
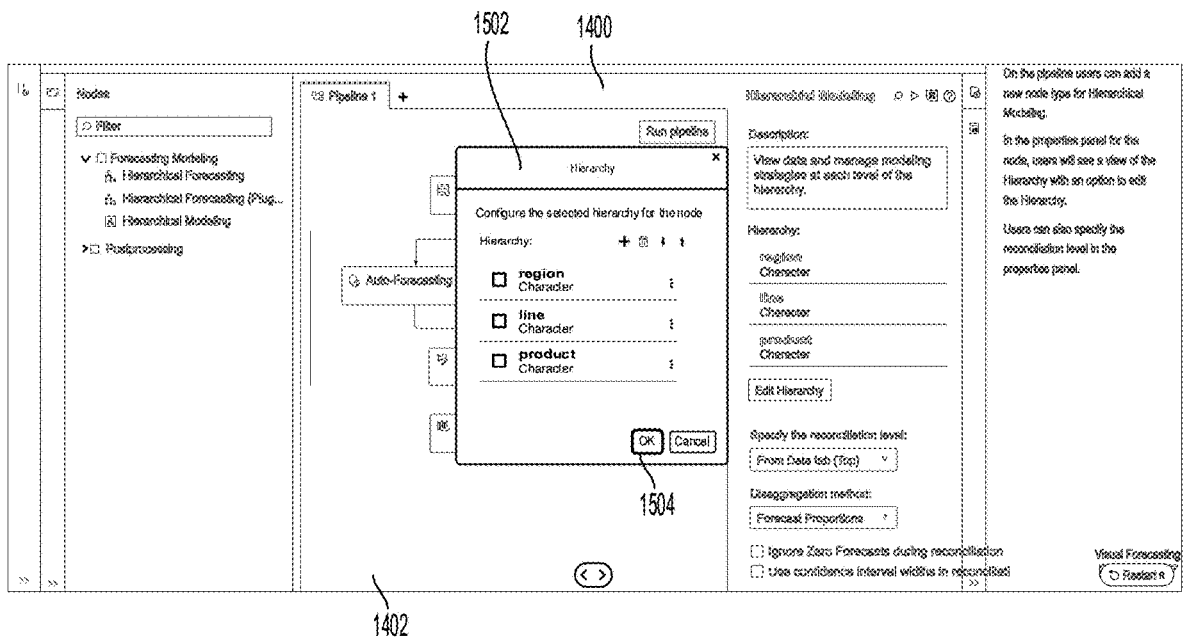
FIG. 15 shows an example of a graphical interface associated with a hierarchical modeling node, where the graphical interface is for creating a time series hierarchy according to some aspects of the present disclosure.

One example of such a new window is shown in FIG. 15. As shown, the user can interact with the hierarchical modeling node 1404a to open a window 1502 or frame that allows the user to select and organize time series into a hierarchical structure. The user can select individual time series or sets of time series (e.g., region, line, and product) to be included in the hierarchy and organize them into the different levels that make up the hierarchy. The user can organize the time series hierarchy based on one or more attributes associated with, but absent from, the input time series for the forecasting pipeline. Examples of such attributes may include a brand or color. Those attributes may characterize the input time series but not actually be part of the time series data themselves. Once the user has arranged the time series into a desired hierarchy, the user can select a submit button 1504 to save the hierarchy.

At this stage, the system can automatically construct a respective level pipeline for each level of the hierarchy. These level pipelines can be default level pipelines, which are automatically created prior to any user customization. The default level pipelines can be constructed based on predefined pipeline templates, in some examples.

Figure 16:
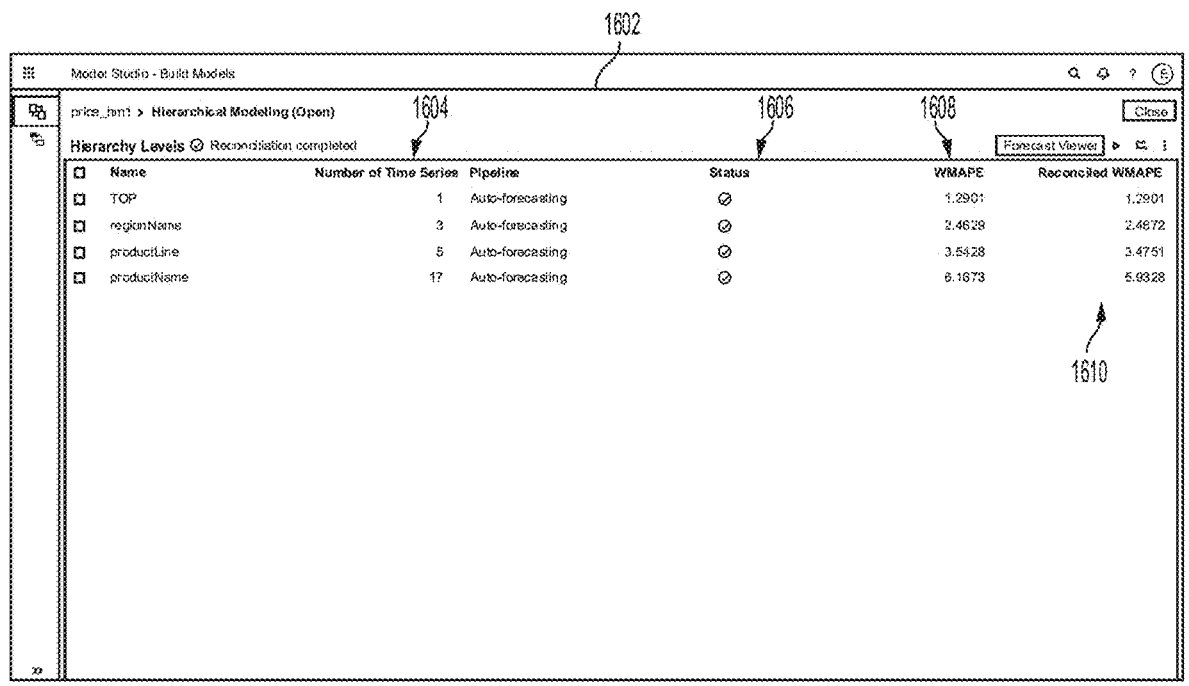
FIG. 16 shows an example of a graphical interface associated with a hierarchical modeling node, where the graphical interface indicates levels of a time series hierarchy and corresponding metrics, according to some aspects of the present disclosure.

The user may further interact with the hierarchical model node to access a summary view 1602, as shown in FIG. 16. The summary view 1602 can show the structure (e.g., levels and organization) of the time series hierarchy, the different sets of time series in the hierarchy, how many time series 1604 are in each set, a status 1606 of each set of time series with respect to whether its corresponding level pipeline has been executed and its results reconciled, and/or one or more metric values 1608-1610. In some examples, the metric values 1608-1610 may correspond to the same metric (e.g., WMAPE), where the first metric value 1608 may be computed based on an aggregated forecast at the corresponding level prior to reconciliation, and where the second metric value 1610 may be computed based on an aggregated forecast at the corresponding level after reconciliation. The summary view 1602 can include any number of such pre-reconciliation metrics, post-reconciliation metrics, or both. The first time the summary view 1602 is shown, if the individual level pipelines have not yet been run, there may not be any values computed yet for the metrics 1608-1620 and the status 1606 may be set to a default status.

In some examples, a user may wish to customize a level pipeline corresponding to a target level of the hierarchy—e.g., to modify the level pipeline from its default arrangement of nodes. To do so, the user may select the target level from the list in the summary view 1602 or from another location in the user interface of the hierarchical modeling node. In response to this selection, the system can display a drag-and-drop canvas with the level pipeline's current arrangement of nodes, as shown in FIG. 17.

Figure 17:
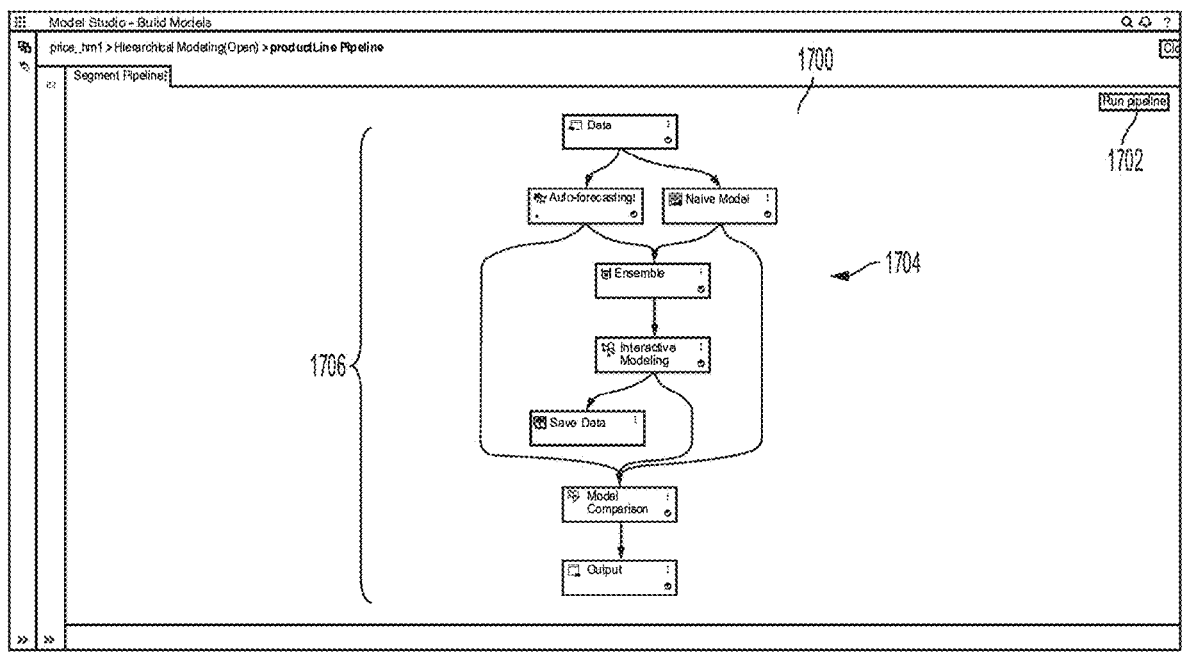
FIG. 17 shows an example of a level pipeline for a level of a time series hierarchy according to some aspects of the present disclosure.

More specifically, as shown in FIG. 17, the graphical user interface can display a drag-and-drop canvas 1700 with the current arrangement of nodes 1704 for a particular level pipeline 1706 associated with a particular level (e.g., the "productLine" level) of the time series hierarchy. The current arrangement of nodes 1704 may be a default arrangement, as described above, or may be a customized arrangement following a previous user customization.

In this example, the current arrangement of nodes 1704 includes an auto-forecasting node with an auto-forecasting model, a native model node with a native model, and an ensemble node that combines the outputs of the auto-forecasting node and the native model node. The current arrangement of nodes 1704 also includes a Save Data node that stores at least some of the computed data to a persistent data store, which can allow that data to be used later by other applications or nodes in other pipelines. The current arrangement of nodes 1704 further includes a model comparison node that compares the outputs of each of the modeling nodes to determine which is the "best" according to a predefined criterion. Of course, the illustrated arrangement is not intended to be limiting and other examples may include other arrangements of nodes. In some examples, at least one of the nodes 1704 may operate on time series data aggregated from one or more lower levels of the time series hierarchy. Some or all of the nodes 1704 may themselves be selectable to open their settings for customization by the user. For instance, the user may select the auto-forecasting node to open a specialized interface for configuring its corresponding auto-forecasting model.

The user can also add nodes to, remove nodes from, or rearrange nodes on the canvas 1700 to modify the level pipeline 1706. Nodes may be added to the canvas 1700 from a node library, similar to the one shown in FIG. 14. Once a new node is on the canvas 1700, the user can drag-and-drop the node into position and make the appropriate connections to the other nodes in the level pipeline 1706.

In some examples, the user may wish to run the level pipeline by itself. To that end, the user interface can include a "run pipeline" button 1702. The user can select this button 1702 and, in response to its selection, the system may run the level pipeline 1706 independently of any other level pipelines and the overall forecasting pipeline 1412. This functionality can allow individual users to independently work on and test the different level pipelines that collectively constitute the overall forecasting pipeline 1412 for the project.

In some examples, multiple users can interact with the user interface of the hierarchical modeling node to create, customize, and/or test the individual level pipelines (corresponding to the levels of the time series hierarchy) independently of one another. This may allow multiple users to jointly work on the forecasting project together, without impeding each other's work. For instance, different users can be assigned to different levels of the time series hierarchy and individually update to their assigned level pipelines over time as needed, without disturbing the work of the other users. In one such example, a first user can interact with a first level pipeline in a first drag-and-drop interface to modify the nodes in the first level pipeline, and a second user can separately interact with a second level pipeline in a second drag-and-drop interface to modify the nodes in the second level pipeline.

When ready, a user can choose to run the overall forecasting pipeline 1412. For instance, referring back to FIG. 14, the user may select the "run pipeline" button 1410 to run the entire pipeline. This can involve executing the operations corresponding to each of the nodes 1404*a-e* in the overall forecasting pipeline 1412 in its designated sequence in the overall forecasting pipeline 1412. With respect to the hierarchical modeling node 1404*a*, the corresponding level pipelines can be executed in series or in parallel to one another. For example, if two or more of the level pipelines do not depend on one another, the system may execute those level pipelines in parallel to save time.

In some examples, multiple hierarchical modeling nodes can be attached to the overall forecasting pipeline 1412. For instance, a first hierarchical modeling node and a second hierarchical modeling node can be positioned at different locations within the overall forecasting pipeline 1412 and each provide the functionality described herein. This can allow there to be multiple different time series hierarchies, with corresponding sets of level pipelines, embedded within a single overall forecasting pipeline 1412.

The output of the hierarchical modeling node 1404*a* can be a set of time series forecasts, where each forecast corresponds to a single level of the time series hierarchy and is generated by the corresponding level pipeline. In other words, each level pipeline can be executed to generate a corresponding forecast for the corresponding level of the time series hierarchy. Each of those individual forecasts may then be displayed in a visualization.

In some examples, the system may also perform a reconciliation process on the forecasts generated by the level pipelines. For example, once the level pipelines have finished executing, the system can automatically trigger a reconciliation process on the resulting forecasts to generate reconciled forecasts. If any level pipeline is then modified by a user while the reconciliation process is running, the system can detect the modification and automatically cancel the reconciliation process to save time and avoid expensive computations on outdated data.

After the reconciliation process is complete, the user can review and explore the reconciled forecast associated with any selected level of the time series hierarchy. For instance, the user can view and explore the reconciled forecast for each level one-at-a-time. In some examples, the system can display a visualization (e.g., a graph) that shows the forecast, the reconciled forecast, and various statistical measures for a level of the time series hierarchy. An example of this visualization is shown in FIG. 18, discussed below.

Figure 18:
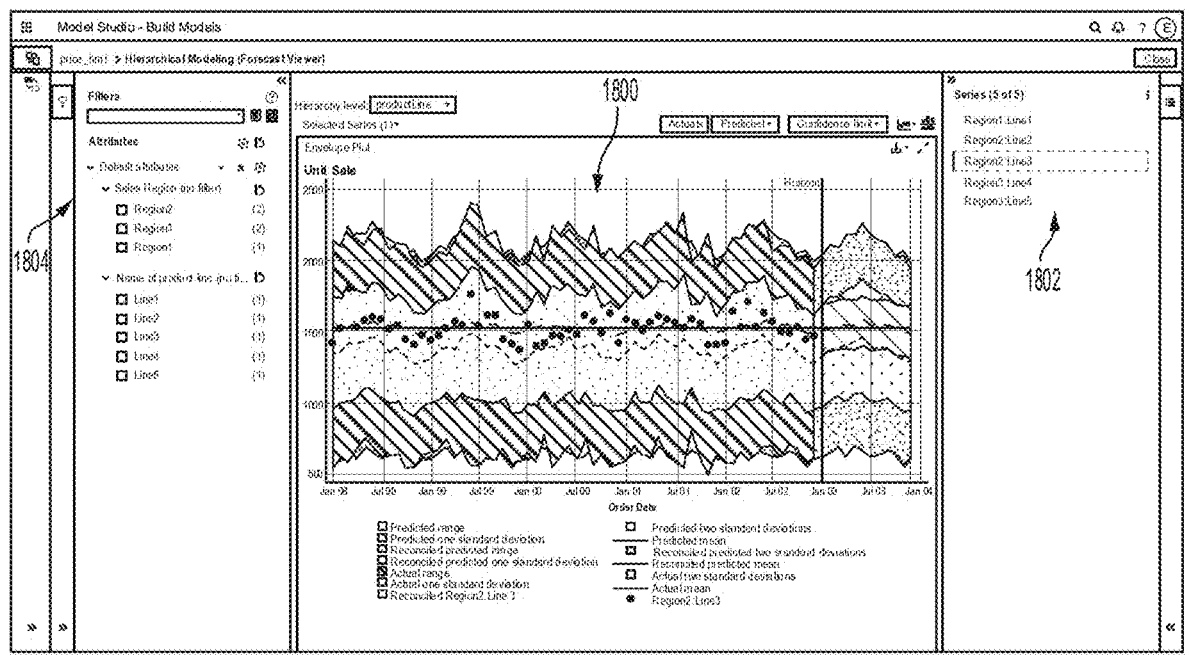
FIG. 18 shows an example of a visualization of a forecast and a reconciled forecast for a level of a time series hierarchy according to some aspects of the present disclosure.

Referring now to FIG. 18, shown is an example of a visualization 1800, which in this example is an envelope graph. The visualization 1800 depicts a forecast and a reconciled forecast, both of which correspond to the same time series in a single level (e.g., "productLine") of the time series hierarchy. The user can select a particular hierarchical level—e.g., from the "Hierarchy Level" dropdown menu shown in FIG. 18—to quickly switch between different levels of the hierarchy. The left, middle, and right panes of the graphical user interface can be updated accordingly based on the aggregated data for the selected level.

Within a single level of the time series hierarchy, there can be multiple time series 1802. In this example, there are five time series corresponding to the individual level of the hierarchy. The user can select one of the time series for display in the visualization 1800 and the system can responsively update the visualization to display the selected information (e.g., the time series, the corresponding forecast, and/or the corresponding reconciled forecast). Additional statistical metrics such as a predicted range, a reconciled predicted range, an actual range, a standard deviation, a predicted mean, an actual mean, a reconciled mean, etc., can also be displayed in the visualization 1800.

Each reconciled forecast can have a corresponding set of attributes. The attributes can be statistical values, such as mean absolute percentage error (MAPE) and number of missing predicted values. In some examples, the user interface can provide a search or filtering mechanism 1804 to allow the user to easily filter the reconciled forecasts based on one or more filter criteria. For example, the user can input one or more search/filter criteria and, in response, the system can automatically identify at least one reconciled forecast that has attributes that match the criteria. The system can then output an indication of the at one reconciled forecast that match the criteria. For example, the system can list the reconciled forecasts that match the criteria. This can make it easier for the user to identify reconciled forecasts that satisfy their needs when there are many (e.g., hundreds) of reconciled forecasts.

Figure 19:
FIG. 19 shows a flowchart of an example of a process involving a hierarchical modeling node according to some aspects of the present disclosure.

Turning now to FIG. 19, shown is a flowchart of an example of a process involving a hierarchical modeling node according to some aspects of the present disclosure. Other examples can include more operations, fewer operations, different operations, or a different sequence of operations than is shown in FIG. 19.

In block 1902, a computer system generates a graphical user interface (GUI) that includes a drag-and-drop canvas for arranging a set of graphical nodes to define an overall forecasting pipeline. The GUI can be part of forecasting software that is executed on the computer system. Forecasting software can be software for generating statistical forecasts based on historical time series data. The drag-and-drop canvas can allow a user to position and reposition the graphical nodes in a particular spatial arrangement and connect them together via directed links. Once positioned and connected, the graphical nodes can be arranged in a particular sequence that defines the overall forecasting pipeline. Each of the graphical nodes can represent a particular functional operation, such as a data preparation operation or a forecasting operation, in the overall forecasting pipeline.

In block 1904, the computer system attaches a hierarchical modeling node to the set of graphical nodes on the drag-and-drop canvas. For example, a user can drag the hierarchical modeling node from a node library onto a particular location of the canvas. The user may then draw one or more connections between the hierarchical modeling node and one or more other graphical nodes on the canvas. This can create a graphical attachment between the hierarchical modeling node and the one or more other graphical nodes on the canvas, which in turn causes the hierarchical modeling node to be inserted into the overall forecasting pipeline at the corresponding location.

In block 1906, the computer system detects a selection of the hierarchical modeling node. For example, the user may single click or double click the hierarchical modeling node, which can be detected by the computer system.

In block 1908, the computer system presents a user interface of the hierarchical modeling node. The user interface can be presented as a popup window within the main GUI, as a frame within the main GUI, or in any other suitable way. The user interface may be specific to the hierarchical modeling node, in that other nodes may have different user interfaces.

In some examples, the user interface can include graphical interface components that allow a user to define a time series hierarchy. For example, the user interface can include graphical interface components that allow a user to select a set of times series for the hierarchy from one or more directories and organize the set of time series into the desired hierarchical structure.

Additionally, the user interface can allow a user to customize separate level pipelines for each level of the time series hierarchy. For example, the user interface can include a list of the levels of the time series hierarchy, where an individual level can be selected by the user to open a drag-and-drop canvas in which a level pipeline can be displayed and customized for the selected level. This drag-and-drop canvas can be different from the drag-and-drop canvas that has the overall forecasting pipeline, so that the level pipeline can be customized separately from the overall forecasting pipeline and the other level pipelines. In some examples, the user interface can be accessed by multiple users concurrently, who can each manage (e.g., create and/or update) a different level pipeline independently and concurrently with one another.

In block 1910, the computer system detects the creation of a time series hierarchy via the user interface of the hierarchical modeling node. For example, the user can select a set of time series stored in a repository using the user interface. The user can then arrange variables associated with the set of time series into a hierarchical structure, for example by dragging-and-dropping the variables into a particular hierarchical order or by using interface components to assign each variable to a level of the hierarchy.

In block 1912, the computer system automatically generates a respective default level pipeline for each level of the time series hierarchy. The computer system can automatically generate the default level pipelines in response to the creation of the time series hierarchy.

In some examples, the computer system can use one or more default pipeline templates, which can be predefined and stored in a pipeline template library, to create the default level pipelines. Each default pipeline template can include a predefined configuration of nodes and connections that defines a default level pipeline. In the pipeline template library, there may be different default pipeline templates for different levels of a time series hierarchy. The computer system can select and use the corresponding default pipeline template for a given level of the hierarchy to generate the corresponding default level pipeline.

In some examples, the default level pipeline can be the same as the pipeline defined in the default pipeline template. In other examples, the default pipeline template can serve as a starting point for the default level pipeline, which can be generated by the computer system by automatically making one or more modifications to the default pipeline template. For example, the default pipeline template may have certain empty fields or variables that are filled in by the computer system when generating the default level pipeline. As another example, the default pipeline template may have certain nodes that are removed by the computer system when generating the default level pipeline, for example, based on the type of time series data to be used with the default level pipeline. As still another example, the computer system may add one or more nodes to the pipeline in the default pipeline template when generating the default level pipeline, for example, based on the type of time series data to be used with the default level pipeline.

In block 1914, the computer system receives a user customization to at least one of the default level pipelines for at least one of the levels of the time series hierarchy, to thereby produce a custom level pipeline for the at least one level of the time series hierarchy. For example, a user may open a default level pipeline (e.g., by interacting with the hierarchical modeling node) so that it is displayed in the user interface. Once it is opened, the user can customize it as desired, for example by adding nodes to or removing nodes from the pipeline. In some examples, the user can delete an existing node from the level pipeline. Additionally or alternatively, the user can modify the location and/or connections of an existing node in the level pipeline. Additionally or alternatively, the user may integrate a new node into the level pipeline. Each of these may constitute a user customization that modifies the default level pipeline in some way.

In block 1916, the computer system executes the level pipelines to generate forecasts. The input to each of the level pipelines can be one or more time series, such as the time series that were previously selected and arranged by the user in block 1910 to create the time series hierarchy. The final output from each of the level pipelines can be a forecast. The forecast is a prediction over a future time window based on the corresponding input time series.

In some examples, the execution of the level pipelines can be triggered by a user input (e.g., a button press). In response to receiving the user input, the computer system can execute the level pipelines in series or in parallel to one another. In some cases, the computer system can execute the level pipelines in parallel to one another by executing the level pipelines on parallel processing threads. During the execution of a given level pipeline, the operations of that level pipeline are executed in the order in which the nodes are organized in the pipeline. The outputs of one operation (e.g., node) can be passed as inputs to the next operation in the pipeline.

In block 1918, the computer system executes a reconciliation process on the forecasts to generate reconciled forecasts. For example, the computer system can determine that all of the level pipelines have finished executing and then trigger the reconciliation process on the resulting forecasts. The reconciliation process can reconcile the forecasts to produce the reconciled forecasts, where each reconciled forecast is a reconciled version of one of the forecasts generated in block 1916.

In block 1920, the computer system generates a visualization of at least one of the reconciled forecasts. The visualization may also display the underlying forecast from which the reconciled forecast was derived. The visualization may further display one or more statistical measures associated with the forecast and/or the reconciled forecast.

Figure 20:
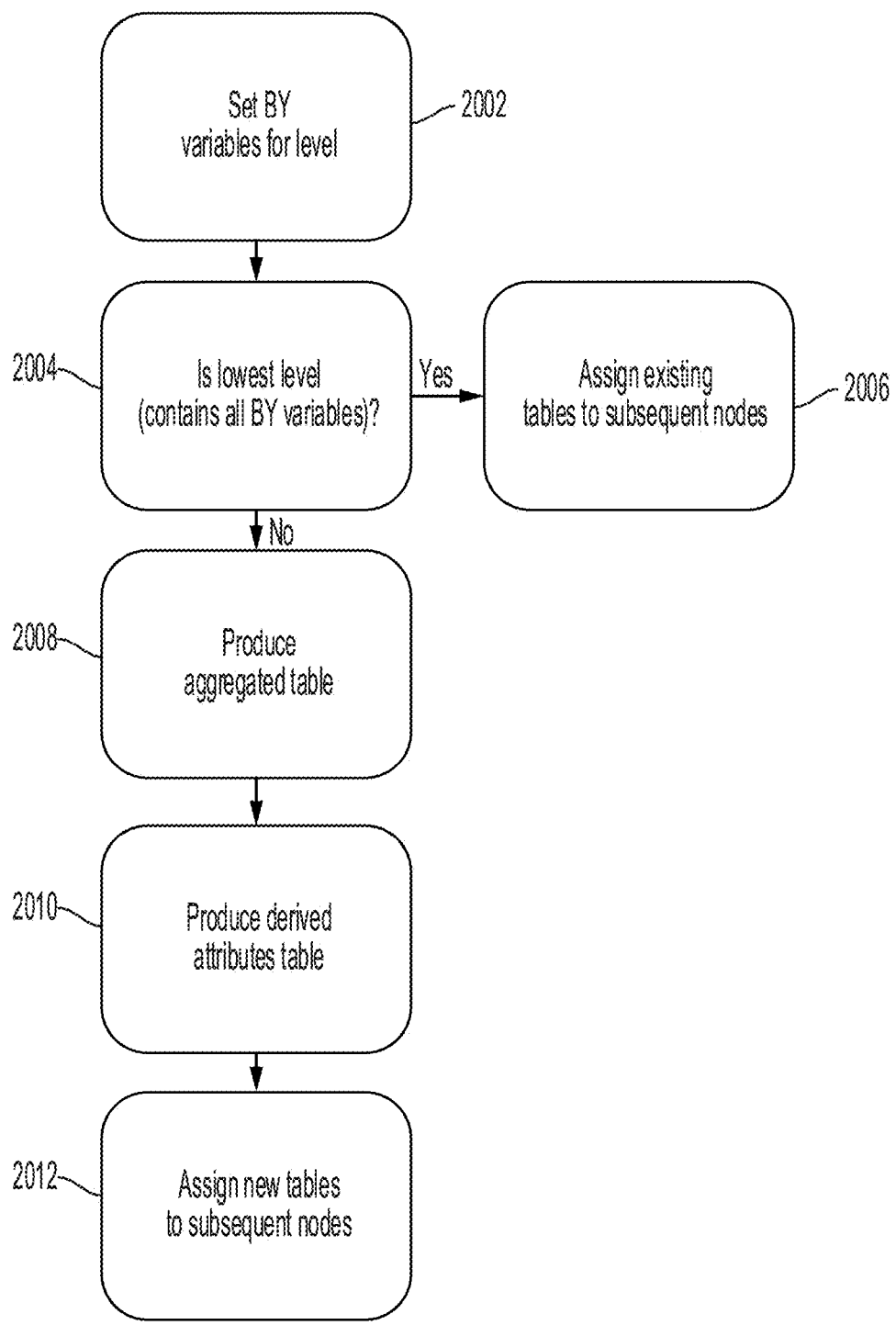
FIG. 20 shows a flowchart of an example of a process for executing a level pipeline according to some aspects of the present disclosure.

More details about the execution of the level pipelines are shown in FIG. 20. In particular, FIG. 20 shows a flowchart of an example of a process for executing a level pipeline according to some aspects of the present disclosure. Other examples may involve more operations, fewer operations, different operations, or a different sequence of operations than is shown in FIG. 20.

In block 2002, the computer system determines a list of variables (e.g., BY variables) from the hierarchy. This may be achieved by truncating the variables that are below the current level in the hierarchy. The computer system can then pass the list of variables as an input argument to each node in the level pipeline.

In blocks 2004-2006, the computer system performs an optimization in which a Data node for the lowest-level pipeline skips the aggregation step and assigns the downstream nodes to consume the existing unaggregated data (e.g., the existing unaggregated tables of data).

In block 2008, the computer system uses the list of variables to produce aggregated time series data for the given level. For example, when a Data node within the level pipeline runs, the computer system can use the list of variables (from block 2002) to produce a table of aggregated time series data for the given level. If one or more of the variables correspond to attributes, a temporary table can be created by joining the input time series data and the attributes data, so that attributes can be used as the variables even though they are not within the input time series data, to produce the aggregated time series data.

In block 2010, the computer system analyzes the resulting aggregated time series data to generate descriptive statistics and other derived attributes.

In block 2012, the computer system assigns the generated data (e.g., the aggregated time series data, the descriptive statistics, and/or the other derived attributes) to be consumed by the downstream nodes in the level pipeline.

Figure 21:
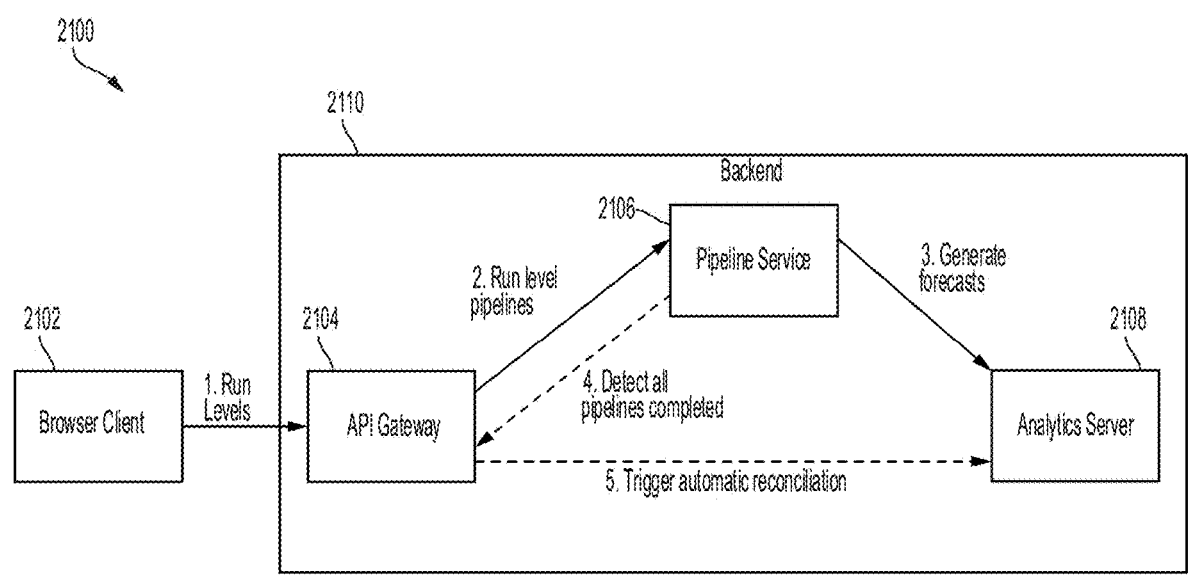
FIG. 21 shows an example of a process for triggering an automated reconciliation of a hierarchy of forecasts according to some aspects of the present disclosure.

As noted earlier, in some examples the reconciliation process may not be triggered until all of the level pipelines have finished executing, which can help reduce errors in the reconciliation process. One example of this is shown in FIG. 21. As shown, a system 2100 can include a browser client 2102, which can exist on the frontend (e.g., the client side in a client-server architecture). The browser client 2102 can communicate with a backend 2110 (e.g., the server side in the client-server architecture) via an API gateway 2104. A user can interact with the user interface described herein via the browser client 2102.

When desired, the user can interact with the browser client 2102 to trigger the execution of the level pipelines. This can cause the browser client 2102 to issue a command (Step 1) to the API gateway 2104 for executing the level pipelines. The API gateway 2104 can forward the command (Step 2) to one or more pipeline services 2106, which can run the level pipelines, thereby producing the forecasts. The forecasts can be transmitted (Step 3) from the one or more pipeline services 2106 to an analytics server 2108, which can be responsible for performing the reconciliation process. Once all of the level pipelines are finished running, the one or more pipeline services 2106 can transmit a notification of the same to the API gateway 2104 (Step 4), which in turn can transmit a command (Step 5) to the analytics server 2108 to trigger the reconciliation process thereon. Alternatively, once all of the level pipelines are finished running, the one or more pipeline services 2106 can transmit the notification to (e.g. directly to) the analytics server 2108, which can serve as a triggering event for the reconciliation process.

Figure 22:
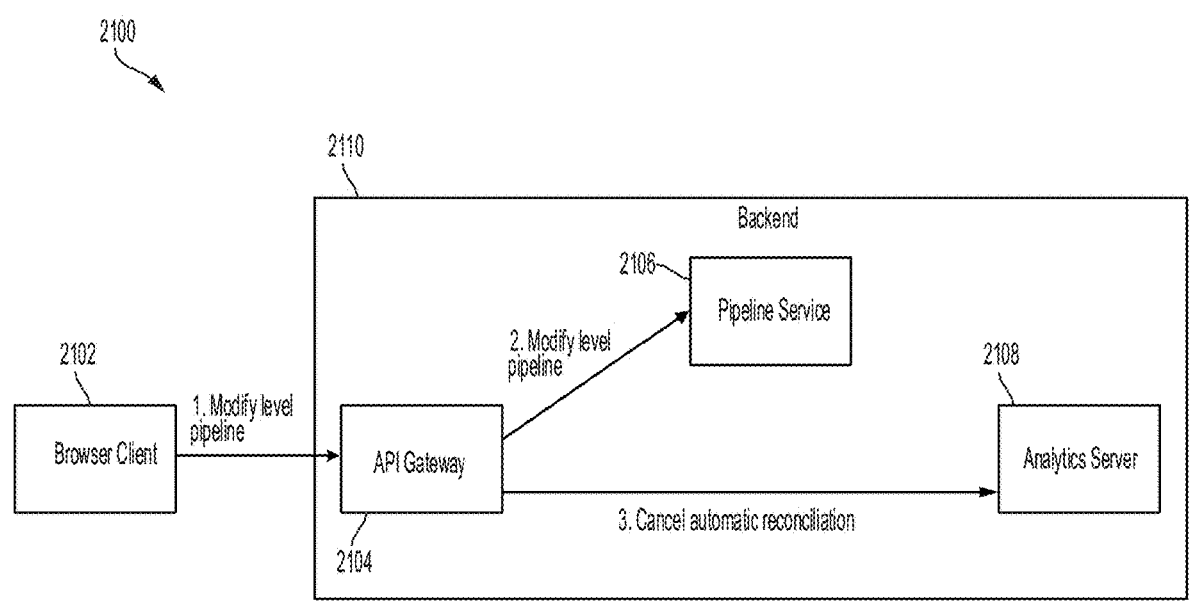
FIG. 22 shows an example of a process for canceling an automated reconciliation of a hierarchy of forecasts according to some aspects of the present disclosure.

In some situations, a user may modify a level pipeline while the reconciliation process is ongoing. To prevent errors, the system 2100 can detect such a modification and responsively cancel a remainder of the reconciliation process. An example of this is shown in FIG. 22. As shown, a user can interact with the user interface via the browser client 2102 to modify a level pipeline while the reconciliation process is ongoing. This may involve the browser client 2102 interacting (Step 1) with the API Gateway 2104. The API gateway 2104 can serve as a central communication hub between the browser client 2102, the pipeline services 2106, and the analytics server 2108. Based on detecting the modification, the API Gateway 2104 can transmit a notification (Step 2) to the one or more pipeline services 2106, which can be responsible for pipeline operations, to modify the level pipeline. The API gateway 2104 can also transmit a command (Step 3) to the analytics server 2108 to cancel the automatic reconciliation. Alternatively, the one or more pipeline services 2106 can transmit the notification to (e.g., directly to) the analytics server 2108, which can serve as a triggering event to cancel the automatic reconciliation.

Figure 23:
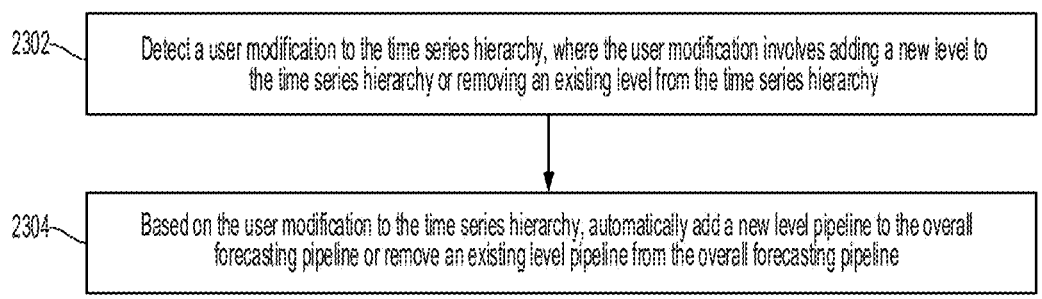
FIG. 23 shows a flowchart of an example of a process for automatically modifying the level pipelines in an overall forecasting pipeline based on a user modification to levels of a time series hierarchy, according to some aspects of the present disclosure.

In some situations, a user may interact with the hierarchical modeling node to modify the existing time series hierarchy (e.g., after the level pipelines have been generated). The user may do so to add a level or remove a level. The system can detect such changes and automatically add a new level pipeline or remove an existing level pipeline, respectively, to the overall forecasting pipeline. FIG. 23 shows an example of this process, described below.

Referring now to FIG. 23, in block 2302, the computer system detects a user modification to the time series hierarchy. The user modification can involve adding a new level to the time series hierarchy or removing an existing level from the time series hierarchy.

In block 2304, the computer system automatically adds a new level pipeline (e.g., a default level pipeline) to the overall forecasting pipeline or automatically removes an existing level pipeline (e.g., a default or customized level pipeline) from the overall forecasting pipeline, based on the user modification. For example, if the user added a new level to the time series hierarchy, the computer system can automatically add a new level pipeline for the new level to the overall forecasting pipeline. On the other hand, if the user removed an existing level from the time series hierarchy, the computer system can automatically remove an existing level pipeline associated with the existing level from the overall forecasting pipeline. In this way, the computer system can automatically adjust the level pipelines in the overall forecasting pipeline based on one or more user modifications to the time series hierarchy over a period of time.

In the previous description, for the purposes of explanation, specific details are set forth in order to provide a thorough understanding of examples of the technology. But various examples can be practiced without these specific details. The figures and description are not intended to be restrictive.

The previous description provides examples that are not intended to limit the scope, applicability, or configuration of the disclosure. Rather, the previous description of the examples provides those skilled in the art with an enabling description for implementing an example. Various changes may be made in the function and arrangement of elements without departing from the spirit and scope of the technology as set forth in the appended claims.

Specific details are given in the previous description to provide a thorough understanding of the examples. But the examples may be practiced without these specific details. For example, circuits, systems, networks, processes, and other components can be shown as components in block diagram form to prevent obscuring the examples in unnecessary detail. In other examples, well-known circuits, processes, algorithms, structures, and techniques may be shown without unnecessary detail in order to avoid obscuring the examples.

Also, individual examples may have been described as a process that is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. And a process can have more or fewer operations than are depicted in a figure. A process can correspond to a method, a function, a procedure, a subroutine, a subprogram, etc. When a process corresponds to a function, its termination can correspond to a return of the function to the calling function or the main function.

Systems depicted in some of the figures can be provided in various configurations. In some examples, the systems can be configured as a distributed system where one or more components of the system are distributed across one or more networks in a cloud computing system.

The invention claimed is:

1. A system comprising:
one or more processors; and
one or more memories including program code that is executable by the one or more processors to perform operations including:
generating a graphical user interface (GUI) for a piece of forecasting software, wherein the GUI includes a drag-and-drop canvas comprising a set of graphical nodes arranged to define an overall forecasting pipeline, each node in the set of graphical nodes corresponding to a respective operation in the overall forecasting pipeline;
based on a user input, attaching a hierarchical modeling node to the set of graphical nodes on the drag-and-drop canvas, wherein the hierarchical modeling node enables a user to define a time series hierarchy comprising a plurality of levels, and wherein the hierarchical modeling node enables one or more users to customize separate level pipelines for each level of the time series hierarchy independently of the other level pipelines for the other levels of the time series hierarchy, each of the level pipelines being a respective subpart of the overall forecasting pipeline;
executing the level pipelines for the plurality of levels of the time series hierarchy to generate a plurality of forecasts, each forecast of the plurality of forecasts corresponding to a respective level of the time series hierarchy;
executing a reconciliation process on the plurality of forecasts to generate a plurality of reconciled forecasts for the plurality of levels of the time series hierarchy, each reconciled forecast of the plurality of reconciled forecasts corresponding to a respective forecast of the plurality of forecasts; and
generating a visualization of a reconciled forecast of the plurality of reconciled forecasts.

2. The system of claim 1, wherein the drag-and-drop canvas is a first drag-and-drop canvas, and wherein the operations further comprise:
presenting a list of the plurality of levels of the time series hierarchy;
detecting a first user selection of a first level of the plurality of levels from the list;
based on detecting the first user selection, presenting a second drag-and-drop canvas on which a first plurality of graphical nodes are arranged to define a first level pipeline corresponding to the first level, the first level pipeline being user customizable by rearranging or modifying the first plurality of graphical nodes on the second drag-and-drop canvas;
detecting a second user selection of a second level of the plurality of levels from the list; and
based on detecting the second user selection, presenting a third drag-and-drop canvas on which a second plurality of graphical nodes are arranged to define a second level pipeline corresponding to the second level, the second level pipeline being user customizable by rearranging or modifying the second plurality of graphical nodes on the third drag-and-drop canvas, the second level pipeline being different from the first level pipeline.

3. The system of claim 2, wherein the first plurality of graphical nodes includes a Save Node configured to cause aggregated data produced for the first level to be saved to a persistent data store.

4. The system of claim 1, wherein the operations further comprise, for each level of the plurality of levels in the time series hierarchy:
deriving a first metric value for a forecast corresponding to the level;
deriving a second metric value for a reconciled forecast corresponding to the level, wherein the first metric value and the second metric value correspond to a same statistical metric; and
outputting, in the GUI, the first metric value and the second metric value in relation to the level.

5. The system of claim 1, wherein the hierarchical modeling node enables the user to define the time series hierarchy based on an attribute that is associated with, but absent from, a time series dataset serving as input to the overall forecasting pipeline.

6. The system of claim 1, wherein the hierarchical modeling node is a first hierarchical modeling node, the plurality of levels is a first plurality of levels, and the operations further comprise:
attaching a second hierarchical modeling node to the set of graphical nodes defining the overall forecasting pipeline on the drag-and-drop canvas, wherein the second hierarchical modeling node enables the user to define a second time series hierarchy comprising a second plurality of levels that is different from the first plurality of levels, and wherein the second hierarchical modeling node enables a second set of level pipelines to be customized for each level of the second time series hierarchy, the second set of level pipelines being a subpart of the overall forecasting pipeline.

7. The system of claim 1, wherein the operations further comprise automatically triggering the reconciliation process in response to detecting that all of the level pipelines have finished executing.

8. The system of claim 7, wherein the operations further comprise:
   detecting a modification to at least one of the level pipelines while the reconciliation process is ongoing; and
   in response to detecting the modification while the reconciliation process is ongoing, canceling execution of a remainder of the reconciliation process.

9. The system of claim 1, wherein the visualization includes both the reconciled forecast and a corresponding forecast of the plurality of forecasts.

10. The system of claim 1, wherein the operations further comprise:
    deriving a corresponding set of attributes for each reconciled forecast of the plurality of reconciled forecasts;
    receiving a user request to filter the plurality of reconciled forecasts based on a filter criterion; and
    based on receiving the user request:
      identifying at least one reconciled forecast, from among the plurality of reconciled forecasts, for which the corresponding set of attributes satisfies the filter criterion; and
      outputting an indication of the at least one reconciled forecast in the GUI.

11. The system of claim 1, wherein the GUI includes a graphical interface component that is operable to selectively display a respective visualization of each reconciled forecast of the plurality of reconciled forecasts.

12. The system of claim 1, wherein the operations further comprise:
    based on the user defining the time series hierarchy, generating a default set of level pipelines for the time series hierarchy, the default set of level pipelines including a respective default pipeline for each level of the time series hierarchy; and
    after generating the default set of level pipelines, receiving user customizations to the default set of level pipelines via the GUI to produce a custom set of level pipelines, wherein the custom set of level pipelines serves as the level pipelines that are executed.

13. The system of claim 1, wherein the operations further comprise:
    detecting a user modification to the time series hierarchy, wherein the user modification involves adding a new level to the time series hierarchy or removing an existing level from the time series hierarchy; and
    based on the user modification to the time series hierarchy, automatically adding a new level pipeline to the overall forecasting pipeline or removing an existing level pipeline from the overall forecasting pipeline, respectively.

14. The system of claim 1, wherein the operations further comprise:
    executing one of the level pipelines without executing the other level pipelines.

15. The system of claim 1, wherein the operations further comprise:
    executing all of the level pipelines in parallel to one another to generate the plurality of forecasts.

16. The system of claim 1, wherein at least one of the level pipelines is configured to operate on time series data aggregated from one or more lower levels of the time series hierarchy.

17. A computer-implemented method, comprising:
    generating a graphical user interface (GUI) for a piece of forecasting software, wherein the GUI includes a drag-and-drop canvas comprising a set of graphical nodes arranged to define an overall forecasting pipeline, each node in the set of graphical nodes corresponding to a respective operation in the overall forecasting pipeline;
    based on a user input, attaching a hierarchical modeling node to the set of graphical nodes on the drag-and-drop canvas, wherein the hierarchical modeling node enables a user to define a time series hierarchy comprising a plurality of levels, and wherein the hierarchical modeling node enables one or more users to customize separate level pipelines for each level of the time series hierarchy independently of the other level pipelines for the other levels of the time series hierarchy, each of the level pipelines being a respective subpart of the overall forecasting pipeline;
    executing the level pipelines for the plurality of levels of the time series hierarchy to generate a plurality of forecasts, each forecast of the plurality of forecasts corresponding to a respective level of the time series hierarchy;
    executing a reconciliation process on the plurality of forecasts to generate a plurality of reconciled forecasts for the plurality of levels of the time series hierarchy, each reconciled forecast of the plurality of reconciled forecasts corresponding to a respective forecast of the plurality of forecasts; and
    generating a visualization of a reconciled forecast of the plurality of reconciled forecasts.

18. The method of claim 17, wherein the drag-and-drop canvas is a first drag-and-drop canvas, and further comprising:
    presenting a list of the plurality of levels of the time series hierarchy;
    detecting a first user selection of a first level of the plurality of levels from the list;
    based on detecting the first user selection, presenting a second drag-and-drop canvas on which a first plurality of graphical nodes are arranged to define a first level pipeline corresponding to the first level, the first level pipeline being user customizable by rearranging or modifying the first plurality of graphical nodes on the second drag-and-drop canvas;
    detecting a second user selection of a second level of the plurality of levels from the list; and
    based on detecting the second user selection, presenting a third drag-and-drop canvas on which a second plurality of graphical nodes are arranged to define a second level pipeline corresponding to the second level, the second level pipeline being user customizable by rearranging or modifying the second plurality of graphical nodes on the third drag-and-drop canvas, the second level pipeline being different from the first level pipeline.

19. The method of claim 18, wherein the first plurality of graphical nodes includes a Save Node configured to cause aggregated data produced for the first level to be saved to a persistent data store.

20. The method of claim 17, further comprising, for each level of the plurality of levels in the time series hierarchy:
    deriving a first metric value for a forecast corresponding to the level;

deriving a second metric value for a reconciled forecast corresponding to the level, wherein the first metric value and the second metric value correspond to a same statistical metric; and outputting, in the GUI, the first metric value and the second metric value in relation to the level.

21. The method of claim 17, wherein the hierarchical modeling node enables the user to define the time series hierarchy based on an attribute that is associated with, but absent from, a time series dataset serving as input to the overall forecasting pipeline.

22. The method of claim 17, wherein the hierarchical modeling node is a first hierarchical modeling node, the plurality of levels is a first plurality of levels, and further comprising:

attaching a second hierarchical modeling node to the set of graphical nodes defining the overall forecasting pipeline on the drag-and-drop canvas, wherein the second hierarchical modeling node enables the user to define a second time series hierarchy comprising a second plurality of levels that is different from the first plurality of levels, and wherein the second hierarchical modeling node enables a second set of level pipelines to be customized for each level of the second time series hierarchy, the second set of level pipelines being a subpart of the overall forecasting pipeline.

23. The method of claim 17, further comprising automatically triggering the reconciliation process in response to detecting that all of the level pipelines have finished executing.

24. The method of claim 23, further comprising:

detecting a modification to at least one of the level pipelines while the reconciliation process is ongoing; and in response to detecting the modification while the reconciliation process is ongoing, canceling execution of a remainder of the reconciliation process.

25. The method of claim 17, wherein the visualization includes both the reconciled forecast and a corresponding forecast of the plurality of forecasts.

26. The method of claim 17, further comprising:

deriving a corresponding set of attributes for each reconciled forecast of the plurality of reconciled forecasts;

receiving a user request to filter the plurality of reconciled forecasts based on a filter criterion; and based on receiving the user request:

identifying at least one reconciled forecast, from among the plurality of reconciled forecasts, for which the corresponding set of attributes satisfies the filter criterion; and outputting an indication of the at least one reconciled forecast in the GUI.

27. The method of claim 17, wherein the GUI includes a graphical interface component that is operable to selectively display a respective visualization of each reconciled forecast of the plurality of reconciled forecasts.

28. The method of claim 17, further comprising:

based on the user defining the time series hierarchy, generating a default set of level pipelines for the time series hierarchy, the default set of level pipelines including a respective default pipeline for each level of the time series hierarchy; and after generating the default set of level pipelines, receiving user customizations to the default set of level pipelines via the GUI to produce a custom set of level pipelines, wherein the custom set of level pipelines serves as the level pipelines that are executed.

29. The method of claim 17, further comprising:

detecting a user modification to the time series hierarchy, wherein the user modification involves adding a new level to the time series hierarchy or removing an existing level from the time series hierarchy; and based on the user modification to the time series hierarchy, automatically adding a new level pipeline to the overall forecasting pipeline or removing an existing level pipeline from the overall forecasting pipeline, respectively.

30. A non-transitory computer-readable medium comprising program code that is executable by one or more processors for causing the one or more processors to perform operations including:

generating a graphical user interface (GUI) for a piece of forecasting software, wherein the GUI includes a drag-and-drop canvas comprising a set of graphical nodes arranged to define an overall forecasting pipeline, each node in the set of graphical nodes corresponding to a respective operation in the overall forecasting pipeline;

based on a user input, attaching a hierarchical modeling node to the set of graphical nodes on the drag-and-drop canvas, wherein the hierarchical modeling node enables a user to define a time series hierarchy comprising a plurality of levels, and wherein the hierarchical modeling node enables one or more users to customize separate level pipelines for each level of the time series hierarchy independently of the other level pipelines for the other levels of the time series hierarchy, each of the level pipelines being a respective subpart of the overall forecasting pipeline;

executing the level pipelines for the plurality of levels of the time series hierarchy to generate a plurality of forecasts, each forecast of the plurality of forecasts corresponding to a respective level of the time series hierarchy;

executing a reconciliation process on the plurality of forecasts to generate a plurality of reconciled forecasts for the plurality of levels of the time series hierarchy, each reconciled forecast of the plurality of reconciled forecasts corresponding to a respective forecast of the plurality of forecasts; and generating a visualization of a reconciled forecast of the plurality of reconciled forecasts.

* * * * *